(12) United States Patent
Schroder, Jr. et al.

(10) Patent No.: US 12,423,349 B2
(45) Date of Patent: Sep. 23, 2025

(54) METHODS AND SYSTEMS FOR GENERATING A STRING IMAGE

(71) Applicant: Heartistry LLC, Atlanta, GA (US)

(72) Inventors: Michael Hilliard Schroder, Jr., Atlanta, GA (US); Michael James Hubley, Magnolia, TX (US)

(73) Assignee: Heartistry LLC, Atlanta, GA (US)

( * ) Notice: Subject to any disclaimer, the term of this patent is extended or adjusted under 35 U.S.C. 154(b) by 292 days.

(21) Appl. No.: 17/830,996

(22) Filed: Jun. 2, 2022

(65) Prior Publication Data

US 2022/0391436 A1    Dec. 8, 2022

Related U.S. Application Data

(60) Provisional application No. 63/195,989, filed on Jun. 2, 2021.

(51) Int. Cl.
*G06F 16/583* (2019.01)
*G06F 16/538* (2019.01)
*G06V 10/60* (2022.01)
*G06V 10/75* (2022.01)

(52) U.S. Cl.
CPC ........ *G06F 16/5838* (2019.01); *G06F 16/538* (2019.01); *G06V 10/60* (2022.01); *G06V 10/751* (2022.01)

(58) Field of Classification Search
CPC ... G06F 16/5838; G06F 16/538; G06V 10/60; G06V 10/751
See application file for complete search history.

(56) References Cited

U.S. PATENT DOCUMENTS

| | | | | |
|---|---|---|---|---|
| 9,830,508 | B1 * | 11/2017 | Winder | G06V 10/28 |
| 9,837,060 | B2 * | 12/2017 | Dobryniewski | G10H 1/14 |
| 9,866,748 | B2 * | 1/2018 | Sivan | H04N 23/75 |
| 9,928,418 | B2 * | 3/2018 | Segalovitz | G06N 3/04 |
| 10,450,682 | B2 * | 10/2019 | Imaizumi | G06T 1/0007 |
| 11,039,062 | B2 * | 6/2021 | Lee | H04N 23/62 |
| 11,748,795 | B2 * | 9/2023 | Dhana | G06T 7/70 705/26.5 |
| 11,847,248 | B2 * | 12/2023 | Vaughan | G16H 10/60 |
| 2024/0294032 | A1 * | 9/2024 | Buyanov | B44C 5/00 |

* cited by examiner

*Primary Examiner* — Gregory M Desire
(74) *Attorney, Agent, or Firm* — Taylor Duma LLP

(57) ABSTRACT

Methods, systems, and apparatuses are described for receiving image data and generating, based on the image data a set of instructions. The instructions may be configured to describe a method of weaving string around a loom so as to generate a string art representation of the received image.

20 Claims, 14 Drawing Sheets

```
var data = Array<number>();
for(var y = 0; y < imagedata.height; y++){
  for(var x = 0; x < imagedata.width; x++){
        var r = (y * 4) * imagedata.width + x * 4;
        var g = ((y+1) * 4) * imagedata.width + x * 4;
        var b = ((y+2) * 4) * imagedata.width + x * 4;
        //var i = (y * 4) * imagedata.width + x * 4;
        var v=(imagedata.data[r]*0.3 + imagedata.data[r]*0.59 + imagedata.data[r]*0.11);
        v=this.contrast*(v-128)+128;
        data.push(v);
  }
}
this.pixelData = data;
```

```
var center = this.IMG_SIZE / 2;
var radius = this.IMG_SIZE / 2 - .5;
let i=0;

console.log("Calculating Pins")
this.pin_coords = [];
for ( let i=0; i<this.N_PINS; i++){
   let angle = (2 * Math.PI * i / this.N_PINS) - 1.5708;
   this.pin_coords.push([Math.floor(center + radius * Math.cos(angle)),
      Math.floor(center + radius * Math.sin(angle))]);
}
```

```
line_cache_y:Array<Array<number>> = Array(this.N_PINS * this.N_PINS).fill(null);
line_cache_x:Array<Array<number>> = Array(this.N_PINS * this.N_PINS).fill(null);

for ( let b = currentPositionInLoop + this.MIN_DISTANCE; b < this.N_PINS; b++){
   var x0 = this.pin_coords[currentPositionInLoop][0];
   var y0 = this.pin_coords[currentPositionInLoop][1];

var x1 = this.pin_coords[b][0];
   var y1 = this.pin_coords[b][1];

var d = Math.floor(Math.sqrt((x1 - x0) * (x1 - x0) + (y1 - y0)*(y1 - y0)));
   var xs = this.linspace(x0, x1, d);
   var ys = this.linspace(y0, y1, d);

this.line_cache_y[(b*this.N_PINS) + currentPositionInLoop] = ys;
   this.line_cache_y[(currentPositionInLoop*this.N_PINS) + b] = ys;
   this.line_cache_x[(b*this.N_PINS) + currentPositionInLoop] = xs;
   this.line_cache_x[(currentPositionInLoop*this.N_PINS) + b] = xs;
}
```

1101 ↘          FIG. 11

```
var error:Array<number> = new Array(this.IMG_SIZE * this.IMG_SIZE);
for(let i=0; i<error.length; i++){
    error[i] = 255 - this.pixelData[i]
}
var current_pin = 0;
    var last_pins:Array<number> = Array.apply(null, {length: 20}).map(Function.call,
function(){return 0;})
    var best_pin = 0;
    var line_err = 0;
    var max_err = 0;
    var index = 0;
    var inner_index = 0;
    var currentPositionInLoop = 0;
best_pin = -1;
    line_err = -1;
    max_err = -1;
    for (let offset = this.MIN_DISTANCE; offset < this.N_PINS - this.MIN_DISTANCE;
offset++){
        let test_pin = (current_pin + offset) % this.N_PINS;

if(last_pins.includes(test_pin)){
          continue;
        }else {
          inner_index = test_pin * this.N_PINS + current_pin;
          line_err = this.getLineErr(error, this.line_cache_y[inner_index],
this.line_cache_x[inner_index]);
          if(line_err > max_err){
            max_err = line_err;
            best_pin = test_pin;
            index = inner_index;
          }
        }
    } this.Line_sequence.push(best_pin);

let coords1:Array<number> = this.line_cache_y[index];
    let coords2:Array<number> = this.line_cache_x[index];

for (let j=0; j < coords1.length; j++){
      let v = (coords1[j] * this.IMG_SIZE) + coords2[j];
      error[v] -= this.LINE_WEIGHT;
      if(error[v] < 0){
        error[v] = 0;
      }
    }
    last_pins.push(best_pin);
    last_pins.shift();
    current_pin = best_pin;
```

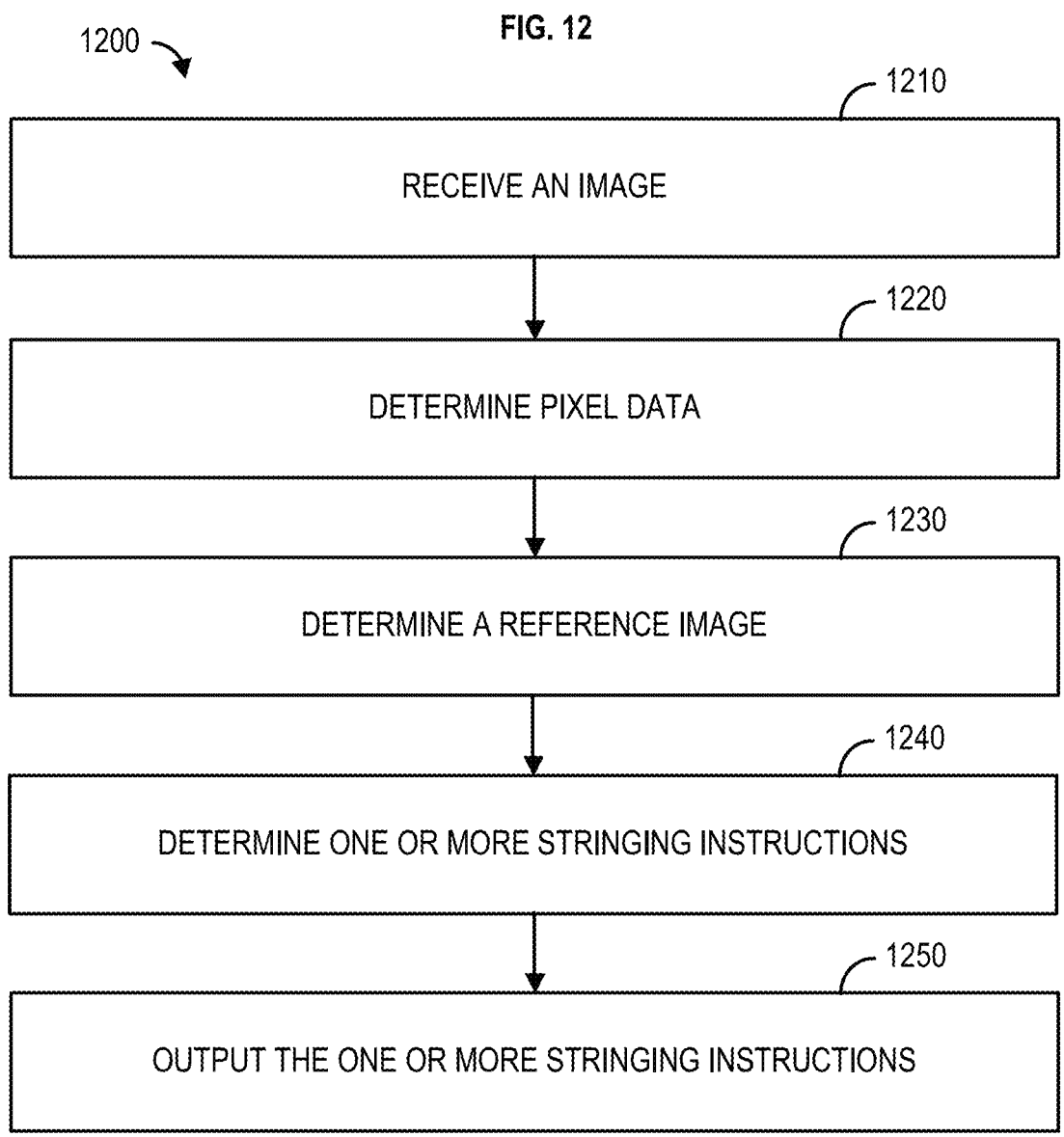

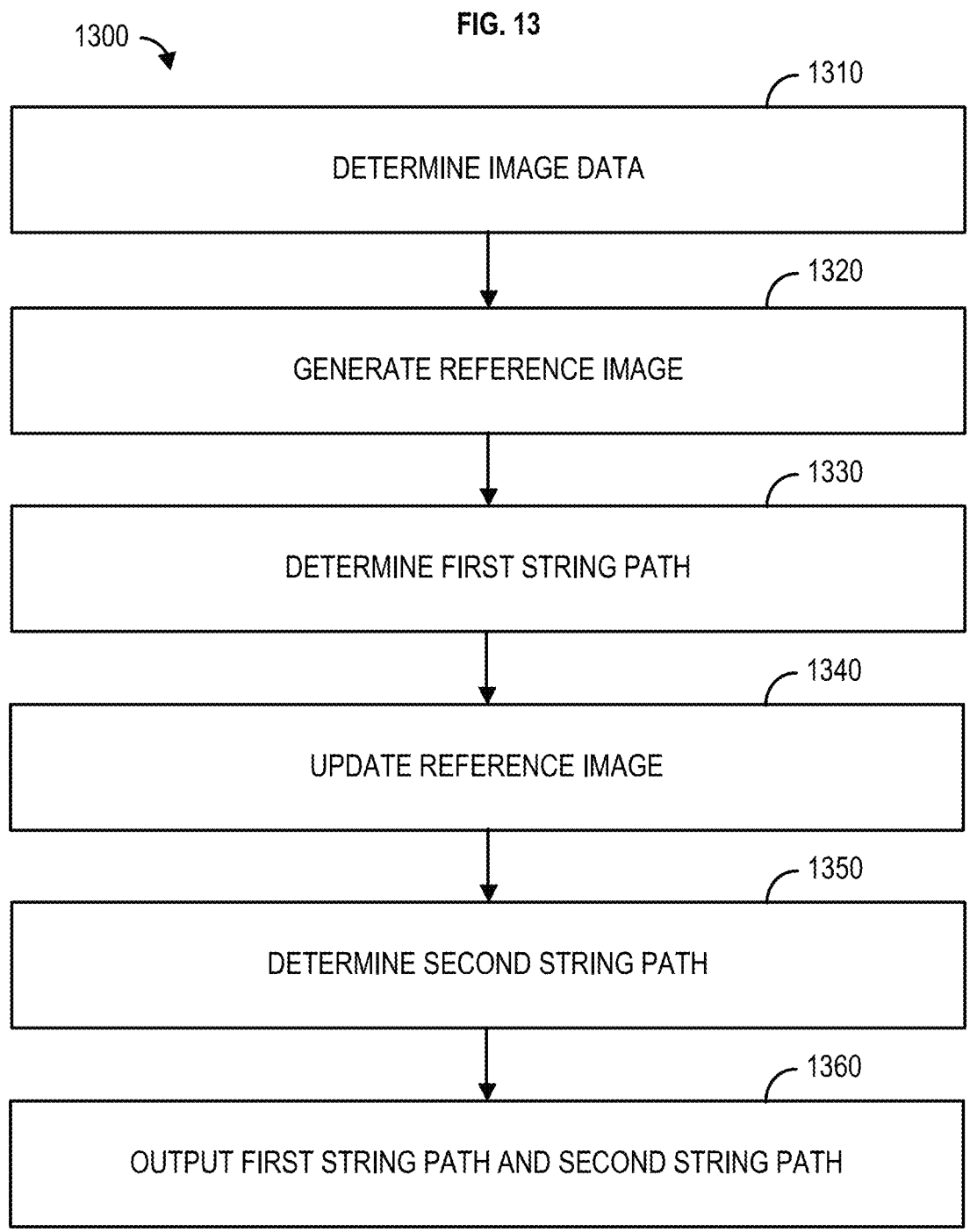

METHODS AND SYSTEMS FOR GENERATING A STRING IMAGE

CROSS-REFERENCE TO RELATED APPLICATION

This application claims the priority benefit of U.S. Provisional Application No. 63/195,989, filed Jun. 2, 2021, the entirety of which is incorporated herein by reference.

BACKGROUND

String art or pin and thread art comprises an arrangement of thread strung between points to form geometric patterns or representational designs such as a subject's face. Thread, wire, or string may be wound around a grid or other arrangement of pins or nails secured to a base structure. The base structure may comprise, for example, a rectangular frame or a circular frame (e.g., a loom). The string art may comprise one or more lines arranged at (e.g., strung) at different angles between one or more pins. However, the number of winds required to complete a piece, and the likelihood of error in stringing make string art labor intensive and time consuming. As such, an improved method and system is needed.

SUMMARY

Methods, systems, and apparatuses are described for determining stringing instructions associated with an image and outputting the stringing instructions so as to be executed by a user. The stringing instructions may comprise a pin sequence. Image data may be received. The image data may comprise a photograph or any other image data. The image data may be processed to determine one or more stringing instructions. The one or more stringing instructions may be output. Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

To easily identify the discussion of any particular element or act, the most significant digit or digits in a reference number refer to the figure number in which that element is first introduced.

FIGS. 10A-10C show example code;
FIG. 11 shows example code;
FIG. 12 shows an example method;
FIG. 13 shows an example method.

DETAILED DESCRIPTION

Figure 1:
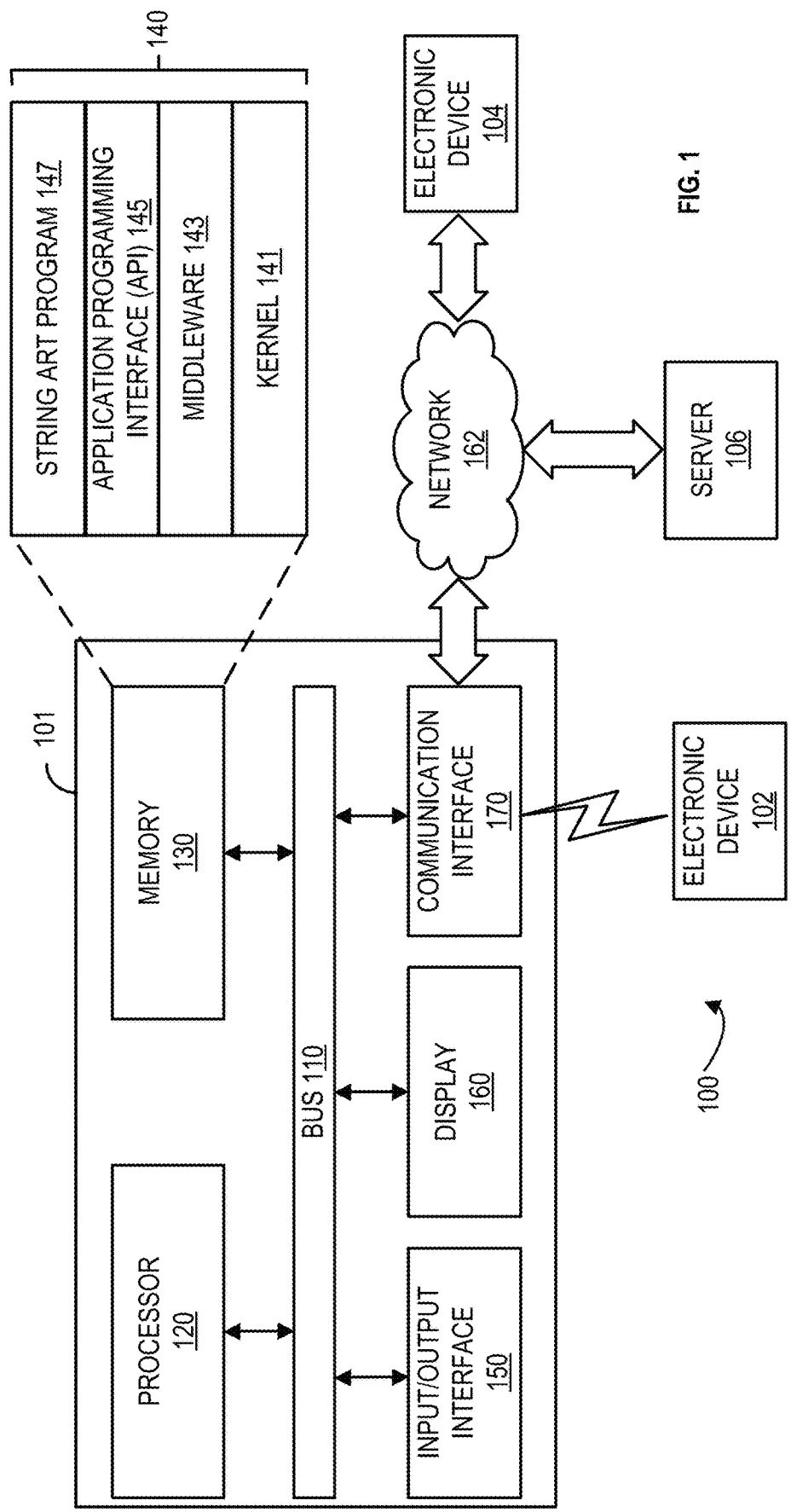
FIG. 1 shows an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application, including, but not limited to, steps in disclosed methods. Thus, if there are a variety of additional steps that can be performed, it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized, including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Hereinafter, various embodiments of the present disclosure will be described with reference to the accompanying drawings. As used herein, the term "user" may indicate a person who uses an electronic device or a device (e.g., an artificial intelligence electronic device) that uses an electronic device.

The present disclosure relates to a method for determining stringing instructions associated with an image and outputting the stringing instructions so as to be executed by a user. The stringing instructions may comprise a sequence of pins around which string may be wound or fastened in order to generate a string image. A computing device may receive an image. The image may be captured for example, by a camera. The camera may be a module of the computing device, or a separate device (e.g., a user device). The image may be received (e.g., retrieved) from a database. For example, the image may be downloaded from the Internet. The image may be associated with image data. The image data may comprise information associated with the image. For example, the image data may comprise color data (e.g., luminosity, chrominance, hue, tone, light or dark, etc.), pixel data (e.g., a number and/or position of one or more pixels), size data (e.g., an amount of data), combinations thereof, and the like. Luminosity may refer to how light or dark a pixel is. For example, luminosity may be represented as an 8-bit integer giving a range of possible values from 0 to 255. For example, a luminosity value of 0 may indicate the associated pixel should be black and a value of 255 may indicate the associated pixel should be white while values in between may indicate various shades of gray.

The computing device may be configured to receive the image data and determine, based on the image data, the stringing instructions. For example, determining the stringing instructions may comprise processing the image data. Processing the image data may comprise manipulating or altering the image data, and/or determining, for example, pixel data and color data. For example, the computing device may determine and process the image data. Processing the image data may be intermittently stopped and started, or may continue uninterrupted. For example, progress may be saved so that a user may return to the string art one or more times.

The systems and methods described herein may include pre-processing. Pre-processing may comprise altering the image data. For example, pre-processing the image data may comprise cropping the image, enlarging or shrinking the image, changing the resolution of the image or any other parameter associated with the image as would be understood in the art including applying a filter, adjusting or otherwise manipulating any one or more of: exposure, brilliance, highlights, shadows, contrast, brightness, black point, saturation, vibrancy, warmth, tint, sharpness, definition, noise reduction, and/or effects such as vignette. For example, pre-processing the image data may comprise adjusting any of the aforementioned and/or cropping the image to generate a circular image.

Processing the image may comprise determining one or more stringing parameters. For example, the one or more stringing parameters may comprise a number of pins located around the perimeter of a loom. The one or more stringing parameters may comprise a number of lines wherein each line is associated with a wind of a string between one or more points around the circumference of the loom.

Processing the image data may comprise determining a shade and a position (e.g., location) associated with one or more pixels. The image data may comprise any number of pixels. For example, a first pixel of the one or more pixels may be located at a first position (x1, y1) while a second pixel of the one or more pixels may be located at a second location (e.g., x2, y2). The first pixel may be associated with a first luminosity and the second pixel associated with a second luminosity.

Determining the stringing instructions may comprise determining one or more possible string paths. The one or more possible string paths may comprise one or more possible paths between the one or more pins. A path may refer to a line or line segment between one or more points (e.g., one or more pins) around the loom. The one or more possible string paths may be cached and associated with a reference image. The computing device may be configured to determine the one or more possible string paths by executing a series of steps over the course of one or more processing rounds. For example, the one or more processing rounds may comprise a first processing round, a second processing round, a third processing round and so on for any number of processing rounds. Each round of processing rounds may comprise determining a darkest path per respective processing round. Each processing round may also comprise subtracting from a reference image the luminosity value of the previous processing round's respective darkest path. The luminosity value may be referred to as a line weight. For example, during the first round of processing, one or more pixel paths may be determined. A luminosity value (e.g., line weight) may be determined for each pixel path. The pixel path weight may refer to the average luminosity value of the pixels which comprise the pixel path. For example, a pixel path may comprise all of the pixels between two points. For example, a pixel path may comprise the pixels located (approximately linearly) between pin 0 and pin 23. During each round of processing, the darkest pixel path (e.g., the lowest average luminance, the highest value between 0 and 255) may be selected and converted to a stringing instruction. That pixel path may then be subtracted from the reference image before the next round of processing is executed. Thus, the processing may gradually deduct from the reference image, over the one or more processing rounds, the darkest path between two pins. The darkest path in any given round may be designated as the winding string path for that round.

According to some embodiments, the representation of the pin sequence may be provided sequentially at a predetermined time interval. For example, a user may set or adjust a time interval between successive pin numbers of a pin sequence being spoken or played through a speaker. In some embodiments, other indicators may be used to represent the pin sequence including but not limited to illumination of a portion of a frame, a textual output, an electronic signal, and an audible output.

According to various embodiments, a user may adjust various parameters of the algorithm. The user may input the parameters into a web or cloud-based application and may see a projection or prediction of the image that would result from executing the algorithmically generated pin sequence by stringing a loom according to the instructions. Such parameter may include, but are not limited to: a thread width, a thread count, a compute time, a frame size, a brightness, a contrast, and a target image quality.

According to various embodiments, the pin sequence may be algorithmically generated based on a thread or string size, in any range corresponding to a standard string sizing, or any other suitable sizing. The pin sequence may also be algorithmically generated based on, for example, a geometry of the frame, a pin count of the frame, a maximum compute time, a thread width, and a thread count of two thousand.

A string path may refer to a line or line segment between one or more points (e.g., between two points). For example, the one or more points may be associated with a boundary of a loom. The computing device may be configured to determine a first string path of the plurality of string paths. The computing device may be configured to determine a second string path of the plurality of string paths. The first string path may comprise a string path that is darker than the second string path. The string path may be associated with the pixel path.

For example, first string path may start at a first pin (e.g., pin 0) and terminate at a second pin (e.g., pin 23). The second string path may start at the second pin (e.g., pin 23) and terminate at a third pin (e.g., pin 289).

The loom may, for example, be circular; however the aforementioned circular loom should not be understood to be limiting and a person skilled in the art will appreciate that any style of loom may be used. For example, the circumference of the circular loom may comprise 360 points (e.g., pins) distributed around the circumference of the loom.

The computing device may be configured to overlay the cropped circular image over a virtual loom comprising 360 points distributed around its circumference. Each of the 360 points may be associated with a virtual pin on the virtual loom.

The stringing instructions may be sent to a user device. For example, the user device may comprise a computer, a laptop, a smart phone, an AR/VR device, combinations thereof, and the like. The user device may be configured to receive the stringing instructions.

In an embodiment, the user device may be configured to output the stringing instructions. For example, the string instructions may comprise an instruction to loop, wind, weave, attach or otherwise place a string in proximity to a pin so as to secure the string to the pin. For example, the stringing instructions may comprise an instruction to wind the string from the first pin to the second pin, from the second pin to a third pin, and so on.

The user device may be configured to display or otherwise output the stringing instructions. For example, the user device may comprise a display configured to display text identifying a starting pin and terminating pin for any given string path. Providing the representation of the pin sequence to the user comprises sequentially presenting each pin of the pin sequence to the user, with each being temporally spaced by a predetermined amount of time. For example, the user device may display text indicating the pin sequence such as, "Pin 0 to Pin 32," and then "Pin 32 to Pin 301." Similarly, the user device may be configured to audibly output the stringing instructions. Similarly, the user device may display a loom and indicate, on the loom, an initial pin (e.g., a starting pin of a respective string path) and an ending pin (e.g., a pin at the terminal end of the respective string path). The starting and ending pins may be indicated (e.g., identified) by any means including changing the color of the starting pin and ending pin, displaying arrows indicating the starting and ending pin, enlarging the starting and ending pins, or any other similar technique. The stringing instructions may be generated algorithmically.

In an embodiment, the user device may comprise an augmented reality/virtual reality ("AR/VR") device. It is to be understand that AR and VR may be used interchangeably and refer to the same circumstances or devices etc. The camera may be configured to capture a field of view representing an extent of the observable world that the camera may image. The AR device may utilize the camera to capture one or more images (e.g., image data) in the field of view, process the image data, and cause output of processed image data (e.g., on a display of the AR device or on a separate display). The image data may include, for example, data associated with the one or more physical objects (e.g., a loom, a reference image, etc. . . . ) in the field of view.

The user device and/or the computing device may be configured to determine three-dimensional (3D) spatial coordinates of the one or more physical objects. For example, the user device may determine, based on a scannable code such as a QR code, its position and orientation relative to the loom. The AR device may also comprise one or more sensors configured to receive and process geographic position data and/or orientation data associated with the AR device. The geographic position data may include, for example, data associated with a location of the AR device, for example, Global Positioning System (GPS) coordinates, altitude, and the like. The orientation data may include, for example, data associated with roll, pitch, and yaw rotations of the AR device. Additional sensors and/or data may be obtained, for example, LIDAR, radar, sonar, signal data (e.g., received signal strength data), and the like. For example, either or both of the user device and/or the AR/VR device may determine a distance from the respective device (and by extension, a user in proximity to the respective device) to the loom and may display the loom accordingly (e.g., larger or smaller depending on the distance).

One or more of the image data, the geographic position data, the orientation data, combinations thereof, and the like, may be used to determine spatial data associated with the augmented reality scene. For example, the spatial data may be associated with the one or more physical objects in the augmented reality scene, a field of view (or center thereof), a center of frame, combinations thereof, and the like. Spatial data may comprise data associated with a position in 3D space (e.g., x, y, z coordinates). The position in 3D space may comprise a position defined by a center of mass of a physical object and/or a position defined by one or more boundaries (e.g., outline) of the physical object.

Depending on the AR application, one or more virtual objects of varying size, shape, orientation, color, and the like may be determined. For example, in an AR string art application, a virtual object such as the virtual loom may be determined and displayed. Spatial data associated with the one or more virtual objects may be determined. The spatial data associated with the one or more virtual objects may comprise data associated with the position in 3D space (e.g., x, y, z coordinates). For a given virtual object of the one or more virtual objects, the position in 3D space may comprise a position defined by a center of mass of the virtual object and/or a position defined by one or more boundaries (e.g., outline or edge) of the virtual object. The spatial data associated with the one or more virtual objects may be registered to spatial data associated with the center of frame. Registering may refer to determining the position of a given virtual object of the one or more virtual objects relative to the position of the center of frame. Registering may also refer to the position of the virtual object relative to both the position of the center of frame and the positions of any of the one or more physical objects in the augmented reality scene. Registering the virtual object to the position of the center of frame and/or the positions of any of the one or more physical objects in the augmented reality scene results in ensuring that a display of the virtual object in the augmented reality scene is made at an appropriate scale and does not overlap (e.g., "clip") with any of the one or more physical objects or any other of the one or more virtual objects in the augmented reality scene.

Movement of the AR device may cause a change in the augmented reality scene. For example, the AR device may pan to one direction and/or may move towards or away from the current position of the AR device. Such movement will impact the augmented reality scene and the virtual object rendered therein. For example, if the AR device moves away from the table with the virtual object rendered on the table (e.g., "anchored" to the table), the virtual object should be reduced in size so as to maintain appropriate scale and to avoid overlap between the virtual object and the table. Likewise, if the AR device moves towards the table with the virtual object rendered on the table (e.g., "anchored" to the table), the virtual object should be increased in size so as to maintain the appropriate scale. Movement of the AR device may cause a change in the positions of any or all of the one or more physical objects in the augmented reality scene. Accordingly, the virtual object may be adjusted in size, orientation, and the like, in order to properly interact with the one or more physical objects (e.g., scale, overlap) as the AR device moves.

The registration of the spatial data associated with the virtual object to the spatial data associated with the center of frame and/or the spatial data associated with the one or more physical objects may be used to compensate for movement of the AR device. The virtual object may be repositioned (e.g., moved, scaled, etc.) based on a relative distance between the position/intended position (defined by the spatial data) of the virtual object and the position (defined by the spatial data) of the center of frame and the positions (defined by the spatial data) of any of the one or more physical objects in the augmented reality scene. The relative distance may be determined according to any technique as is known in the art. In an embodiment, a vector between the physical object and the center of frame may be determined. For example, using a depth of focus, time of flight, LIDAR, sonar, radar, or the like, distances such as a distance between the AR device and any of the one or more physical objects may be determined. Additionally, other distances, such as a distance between one physical object and another physical object may be determined. Accordingly, any shift of the one or more physical objects or the virtual object within the frame can be determined by a change in position relative to the center of frame. The virtual object may be repositioned based on the relative distance. Repositioning the virtual object may include, for example, adjusting the position, scale, and/or orientation of the virtual object so that the virtual object remains "anchored" (e.g., "on") to the one or more physical objects. For example, if the virtual object is not moving within the augmented reality scene (e.g., the virtual animal remains at rest on the table), the position of the virtual object in the augmented reality scene may be adjusted to maintain appropriate position, scale, and/or orientation. In another example, if the virtual object is moving within the augmented reality scene (e.g., the virtual animal jumps off the table), the position of the virtual object in the augmented reality scene may be adjusted to maintain appropriate position, scale, and/or orientation.

The AR device may be configured to display, for example, a virtual loom. The virtual loom may be displayed in an augmented reality scene such that the virtual loom appears in or on the display as if it were in a physical space within the field of view of the AR device. The virtual loom may comprise a plurality of virtual pins. Upon initiation, an application may be configured to receive, for example, via a camera module, one or more identifiers (e.g., a QR code, bar code, or other identifier) configured to cause the application to cause display of the virtual loom. Upon receipt of the stringing instructions, the AR device may determine a virtual pin associated with a pin in the stringing instructions. For example, if the stringing instructions indicate a user is to weave the string from pin 0 to pin 32, the AR device may be configured to display text, output audio, or otherwise indicate the string is to be woven from pin 0 to pin 32. In an embodiment, the AR device may be configured to highlight, on the virtual loom one or more virtual pins. For example, the AR device may highlight pin 0 in green to indicate the user should weave the string around pin 0 and may highlight pin 32 in orange to indicate to the user that after the string is wound around pin 0, the string should be wound around pin 32. This process may be repeated.

The AR device may be configured to receive one or more user inputs. For example, the AR device may receive, via the user interface, a user input indicating that the user has wound the string around pin 32. Upon receiving the input, the AR device may determine, based on the stringing instructions, the next pin and display (e.g., highlight or otherwise indicate), accordingly that the next pin is pin 301. As such, a user may be guided through the stringing instructions until a string art image has been rendered.

FIG. 1 illustrates a network environment including an electronic device configured for generating stringing instructions according to various embodiments. Referring to FIG. 1, an electronic device 101 in a network environment 100 is disclosed according to various exemplary embodiments. The electronic device 101 may include a bus 110, a processor 120, a memory 130, an input/output interface 150, a display 160, and a communication interface 170. In a certain exemplary embodiment, the electronic device 101 may omit at least one of the aforementioned constitutional elements or may additionally include other constitutional elements. The electronic device 101 may be, for example, a mobile phone, a tablet computer, a laptop, a desktop computer, a smartwatch, and the like.

The bus 110 may include a circuit for connecting the aforementioned constitutional elements 110 to 170 to each other and for delivering communication (e.g., a control message and/or data) between the aforementioned constitutional elements.

The processor 120 may include one or more of a Central Processing Unit (CPU), an Application Processor (AP), and a Communication Processor (CP). The processor 120 may control, for example, at least one of other constitutional elements of the electronic device 101 and/or may execute an arithmetic operation or data processing for communication. The processing (or controlling) operation of the processor 120 according to various embodiments is described in detail with reference to the following drawings.

The memory 130 may include a volatile and/or non-volatile memory. The memory 130 may store, for example, a command or data related to at least one different constitutional element of the electronic device 101. According to various exemplary embodiments, the memory 130 may store a software and/or a program 140. The program 140 may include, for example, a kernel 141, a middleware 143, an Application Programming Interface (API) 145, and/or an application program (e.g., "application" or "mobile app") 147, or the like. The application program 147 may be a program, configured for controlling one or more functions of the electronic device 101 and/or an external device (e.g., a loom device, an AR/VR device). At least one part of the kernel 141, middleware 143, or API 145 may be referred to as an Operating System (OS). The memory 130 may include a computer-readable recording medium having a program recorded therein to perform the method according to various embodiment by the processor 120.

The kernel 141 may control or manage, for example, system resources (e.g., the bus 110, the processor 120, the memory 130, etc.) used to execute an operation or function implemented in other programs (e.g., the middleware 143, the API 145, or the application program 147). Further, the kernel 141 may provide an interface capable of controlling or managing the system resources by accessing individual constitutional elements of the electronic device 101 in the middleware 143, the API 145, or the application program 147.

The middleware 143 may perform, for example, a mediation role so that the API 145 or the application program 147 can communicate with the kernel 141 to exchange data.

Further, the middleware 143 may handle one or more task requests received from the application program 147 according to a priority. For example, the middleware 143 may assign a priority of using the system resources (e.g., the bus 110, the processor 120, or the memory 130) of the electronic device 101 to at least one of the application programs 147. For instance, the middleware 143 may process the one or more task requests according to the priority assigned to the at least one of the application programs, and thus may perform scheduling or load balancing on the one or more task requests.

The API 145 may include at least one interface or function (e.g., instruction), for example, for file control, window control, video processing, or character control, as an interface capable of controlling a function provided by the application 147 in the kernel 141 or the middleware 143.

For example, the input/output interface 150 may play a role of an interface for delivering an instruction or data input from a user or a different external device(s) to the different constitutional elements of the electronic device 101. Further, the input/output interface 150 may output an instruction or data received from the different constitutional element(s) of the electronic device 101 to the different external device(s).

The display 160 may include various types of displays, for example, a Liquid Crystal Display (LCD) display, a Light Emitting Diode (LED) display, an Organic Light-Emitting Diode (OLED) display, a MicroElectroMechanical Systems (MEMS) display, or an electronic paper display. The display 160 may display, for example, a variety of contents (e.g., text, image, video, icon, symbol, etc.) to the user. The display 160 may include a touch screen. For example, the display 160 may receive a touch, gesture, proximity, or hovering input by using a stylus pen or a part of a user's body.

In an embodiment, the display 160 may be configured for displaying stringing instructions. The stringing instructions may comprise one or more steps. The one or more steps may comprise one or more pins displayed or associated with one or more steps and/or one or more step numbers. For example, the one or more steps may comprise a first step and one or more subsequent steps. For example, the first step may be associated with step number "1," and likewise the second and third and so on. Each step of the one or more steps may comprise an association between the step number and a pin of the one or more pins. Each pin of the one or more pins may likewise be associated with a pin number. The pin number may indicate a position on a loom. For example, a pin number of "0" may indicate a position at a "top" of the loom (if the loom were oriented vertically). For example, if 360 pins were distributed evenly around the perimeter of the circular loom, a topmost pin may be associated with pin number "0," while a pin at the "bottom" of the loom may be associated with a pin number of 180.

The communication interface 170 may establish, for example, communication between the electronic device 101 and the external device (e.g., electronic device 102, electronic device 104, or a server 106). For example, the communication interface 170 may communicate with the external device (e.g., the second external electronic device 104 or the server 106) via a network 162. The network 162 may make use of both wireless and wired communication protocols.

For example, as a wireless communication protocol, the wireless communication may use at least one of Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), other cellular technologies, combinations thereof, and the like. Further, the wireless communication may include, for example, a near-distance communication protocol 164. The near-distance communication protocol 164 may include, for example, at least one of Wireless Fidelity (WiFi), Bluetooth, Near Field Communication (NFC), Global Navigation Satellite System (GNSS), and the like. According to a usage region or a bandwidth or the like, the GNSS may include, for example, at least one of Global Positioning System (GPS), Global Navigation Satellite System (Glonass), Beidou Navigation Satellite System (hereinafter, "Beidou"), Galileo, the European global satellite-based navigation system, and the like. Hereinafter, the "GPS" and the "GNSS" may be used interchangeably in the present document. The wired communication may include, for example, at least one of Universal Serial Bus (USB), High Definition Multimedia Interface (HDMI), Recommended Standard-232 (RS-232), power-line communication, Plain Old Telephone Service (POTS), and the like. The network 162 may include, for example, at least one of a telecommunications network, a computer network (e.g., LAN or WAN), the internet, and a telephone network.

According to one exemplary embodiment, the server 106 may include a group of one or more servers. According to various exemplary embodiments, all or some of the operations executed by the electronic device 101 may be executed in a different one or a plurality of electronic devices (e.g., the electronic device 102, the electronic device 104, or the server 106). According to one exemplary embodiment, if the electronic device 101 needs to perform a certain function or service either automatically or at a request, the electronic device 101 may request at least some parts of functions related thereto alternatively or additionally to a different electronic device (e.g., the electronic device 102, the electronic device 104, or the server 106) instead of executing the function or the service autonomously. The different electronic device (e.g., the electronic device 102, the electronic device 104, or the server 106) may execute the requested function or additional function and may deliver a result thereof to the electronic device 101. The electronic device 101 may provide the requested function or service either directly or by additionally processing the received result. For this, for example, a cloud computing, distributed computing, or client-server computing technique may be used.

Figure 2:
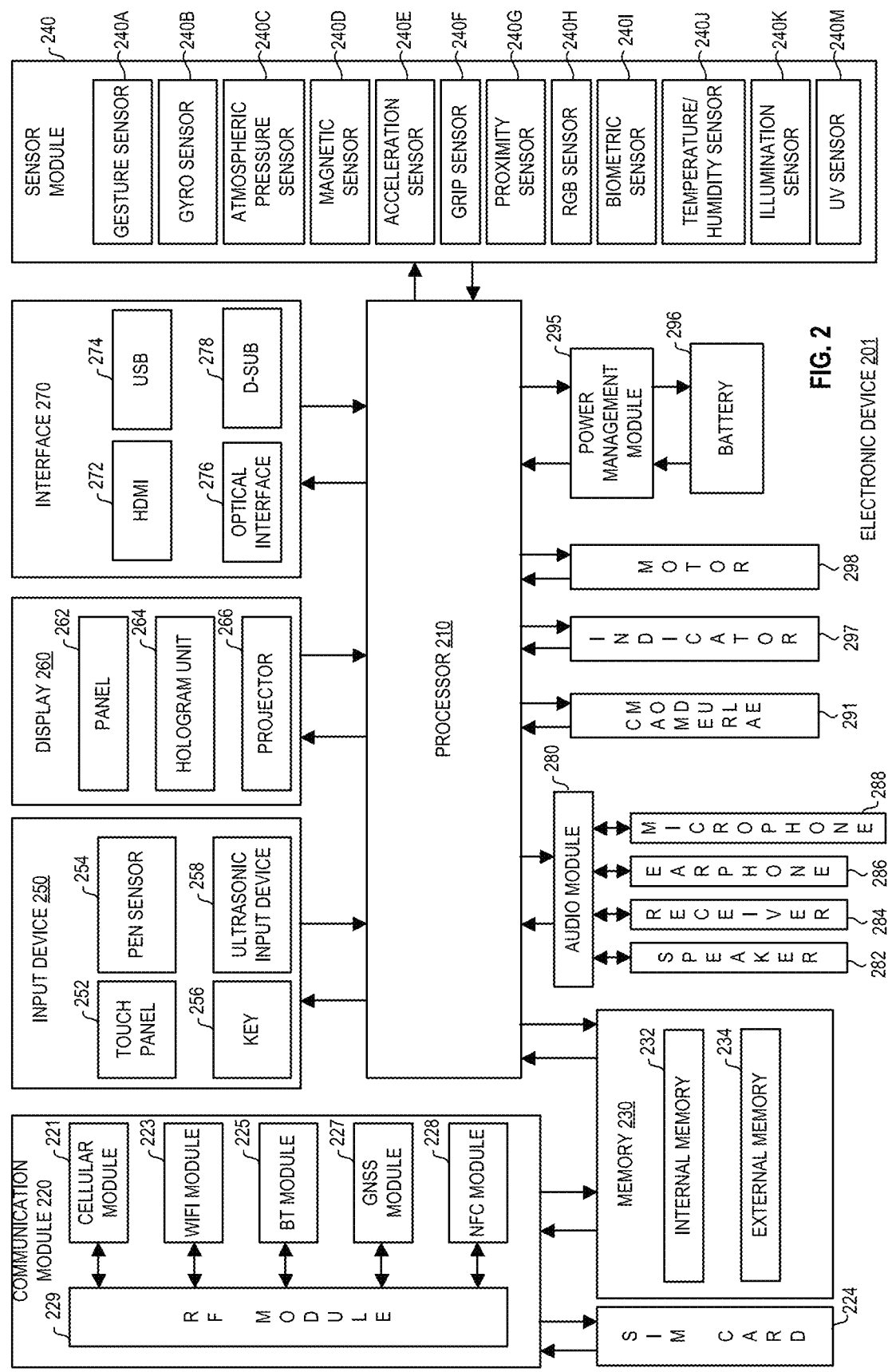
FIG. 2 shows an example device.

FIG. 2 is a block diagram of an electronic device 201 according to various exemplary embodiments. The electronic device 201 may comprise an AR/VR device. The electronic device 201 may include, for example, all or some parts of the electronic device 101, the electronic device 102, or the electronic device 104 of FIG. 1. The electronic device 201 may include one or more processors (e.g., Application Processors (APs)) 210, a communication module 220, a subscriber identity module 224, a memory 230, a sensor module 240, an input unit 250, a display 260, an interface 270, an audio module 280, a camera unit 291, a power management module 295, a battery 296, an indicator 297, and a motor 298.

The processor 210 may control a plurality of hardware or software constitutional elements connected to the processor 210 by driving, for example, an operating system or an application program, and may process a variety of data, including multimedia data and may perform an arithmetic operation. The processor 210 may be implemented, for example, with a System on Chip (SoC). According to one exemplary embodiment, the processor 210 may further include a Graphic Processing Unit (GPU) and/or an Image Signal Processor (ISP). The processor 210 may include at least one part (e.g., a cellular module 221) of the aforementioned constitutional elements of FIG. 1. The processor 210 may process an instruction or data, which is received from at least one of different constitutional elements (e.g., a non-volatile memory), by loading it to a volatile memory and may store a variety of data in the non-volatile memory.

The communication module 220 may have a structure the same as or similar to the communication interface 170 of FIG. 1. The communication module 220 may include, for example, the cellular module 221, a Wi-Fi module 223, a BlueTooth (BT) module 225, a GNSS module 227 (e.g., a GPS module, a Glonass module, a Beidou module, or a Galileo module), a Near Field Communication (NFC) module 228, and a Radio Frequency (RF) module 229.

The cellular module 221 may provide a voice call, a video call, a text service, an internet service, or the like, for example, through a communication network. According to one exemplary embodiment, the cellular module 221 may identify and authenticate the electronic device 201 in the communication network by using the subscriber identity module (e.g., a Subscriber Identity Module (SIM) card) 224. According to one exemplary embodiment, the cellular module 221 may perform at least some functions that can be provided by the processor 210. According to one exemplary embodiment, the cellular module 221 may include a Communication Processor (CP).

Each of the WiFi module 223, the BT module 225, the GNSS module 227, or the NFC module 228 may include, for example, a processor for processing data transmitted/received via a corresponding module. According to a certain exemplary embodiment, at least one of the cellular module 221, the WiFi module 223, the BT module 225, the GPS module 227, and the NFC module 228 may be included in one Integrated Chip (IC) or IC package.

The RF module 229 may transmit/receive, for example, a communication signal (e.g., a Radio Frequency (RF) signal). The RF module 229 may include, for example, a transceiver, a Power Amp Module (PAM), a frequency filter, a Low Noise Amplifier (LNA), an antenna, or the like. According to another exemplary embodiment, at least one of the cellular module 221, the WiFi module 223, the BT module 225, the GPS module 227, and the NFC module 228 may transmit/receive an RF signal via a separate RF module.

The subscriber identity module 224 may include, for example, a card including the subscriber identity module and/or an embedded SIM, and may include unique identification information (e.g., an Integrated Circuit Card IDentifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)).

The external memory 234 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 234 may be operatively and/or physically connected to the electronic device 201 via various interfaces.

The sensor module 240 may measure, for example, a physical quantity or detect an operational status of the electronic device 201, and may convert the measured or detected information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, an Ultra Violet (UV) sensor 240M, an ultrasonic sensor 240N, and an optical sensor 240P. Additionally or alternatively, the sensor module 240 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 240 may further include a control circuit for controlling at least one or more sensors included therein. In a certain exemplary embodiment, the electronic device 201 may further include a processor configured to control the sensor module 204 either separately or as one part of the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may recognize a touch input, for example, by using at least one of an electrostatic type, a pressure-sensitive type, and an ultrasonic type detector. In addition, the touch panel 252 may further include a control circuit. The touch panel 252 may further include a tactile layer and thus may provide the user with a tactile reaction (e.g., haptic feedback).

The (digital) pen sensor 254 may be, for example, one part of a touch panel, or may include an additional sheet for recognition. The key 256 may be, for example, a physical button, an optical key, a keypad, or a touch key. The ultrasonic input device 258 may detect an ultrasonic wave generated from an input means through a microphone (e.g., a microphone 288) to confirm data corresponding to the detected ultrasonic wave.

The display 260 (e.g., the display 160) may include a panel 262, a hologram unit 264, or a projector 266. The panel 262 may include a structure the same as or similar to the display 160 of FIG. 1. The panel 262 may be implemented, for example, in a flexible, transparent, or wearable manner. The panel 262 may be constructed as one module with the touch panel 252. According to one exemplary embodiment, the panel 262 may include a pressure sensor (or a force sensor) capable of measuring a pressure of a user's touch. The pressure sensor may be implemented in an integral form with respect to the touch panel 252, or may be implemented as one or more sensors separated from the touch panel 252.

The hologram unit 264 may use an interference of light and show a stereoscopic image in the air. The projector 266 may display an image by projecting a light beam onto a screen. The screen may be located, for example, inside or outside the electronic device 201. According to one exemplary embodiment, the display 260 may further include a control circuit for controlling the panel 262, the hologram unit 264, or the projector 266.

The interface 270 may include, for example, a High-Definition Multimedia Interface (HDMI) 272, a Universal Serial Bus (USB) 274, an optical communication interface 276, or a D-subminiature (D-sub) 278. The interface 270 may be included, for example, in the communication interface 170 of FIG. 1. Additionally or alternatively, the interface 270 may include, for example, a Mobile High-definition Link (MHL) interface, a Secure Digital (SD)/Multi-Media Card (MMC) interface, or an Infrared Data Association (IrDA) standard interface.

The audio module 280 may bilaterally convert, for example, a sound and electric signal. At least some constitutional elements of the audio module 280 may be included in, for example, the input/output interface 150 of FIG. 1. The audio module 280 may convert sound information, which is input or output, for example, through a speaker 282, a receiver 284, an earphone 286, the microphone 288, or the like.

The camera module 291 may comprise, for example, a device for image and video capturing, and according to one exemplary embodiment, may include one or more image sensors (e.g., a front sensor or a rear sensor), a lens, an Image Signal Processor (ISP), or a flash (e.g., LED or xenon lamp).

The power management module 295 may manage, for example, power (e.g., consumption or output) of the electronic device 201. According to one exemplary embodiment, the power management module 295 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. A battery gauge may measure, for example, residual quantity of the battery 296 and voltage, current, and temperature during charging. The battery 296 may include, for example, a non-rechargeable battery, a rechargeable battery, and/or a solar battery.

The indicator 297 may display a specific state, for example, a booting state, a message state, a charging state, or the like, of the electronic device 201 or one part thereof (e.g., the processor 210). The motor 298 may convert an electric signal into a mechanical vibration, and may generate a vibration or haptic effect. Although not shown, the electronic device 201 may include a processing device (e.g., a GPU) for supporting a mobile TV. The processing device for supporting the mobile TV may process media data conforming to a protocol of, for example, Digital Multimedia Broadcasting (DMB), Digital Video Broadcasting (DVB), Media-Flo™, or the like.

Each of the constitutional elements described in the present document may consist of one or more components, and names thereof may vary depending on a type of an electronic device. The electronic device, according to various exemplary embodiments, may include at least one of the constitutional elements described in the present document. Some of the constitutional elements may be omitted, or additional other constitutional elements may be further included. Further, some of the constitutional elements of the electronic device, according to various exemplary embodiments, may be combined and constructed as one entity so as to equally perform functions of corresponding constitutional elements before combination.

Figure 3:
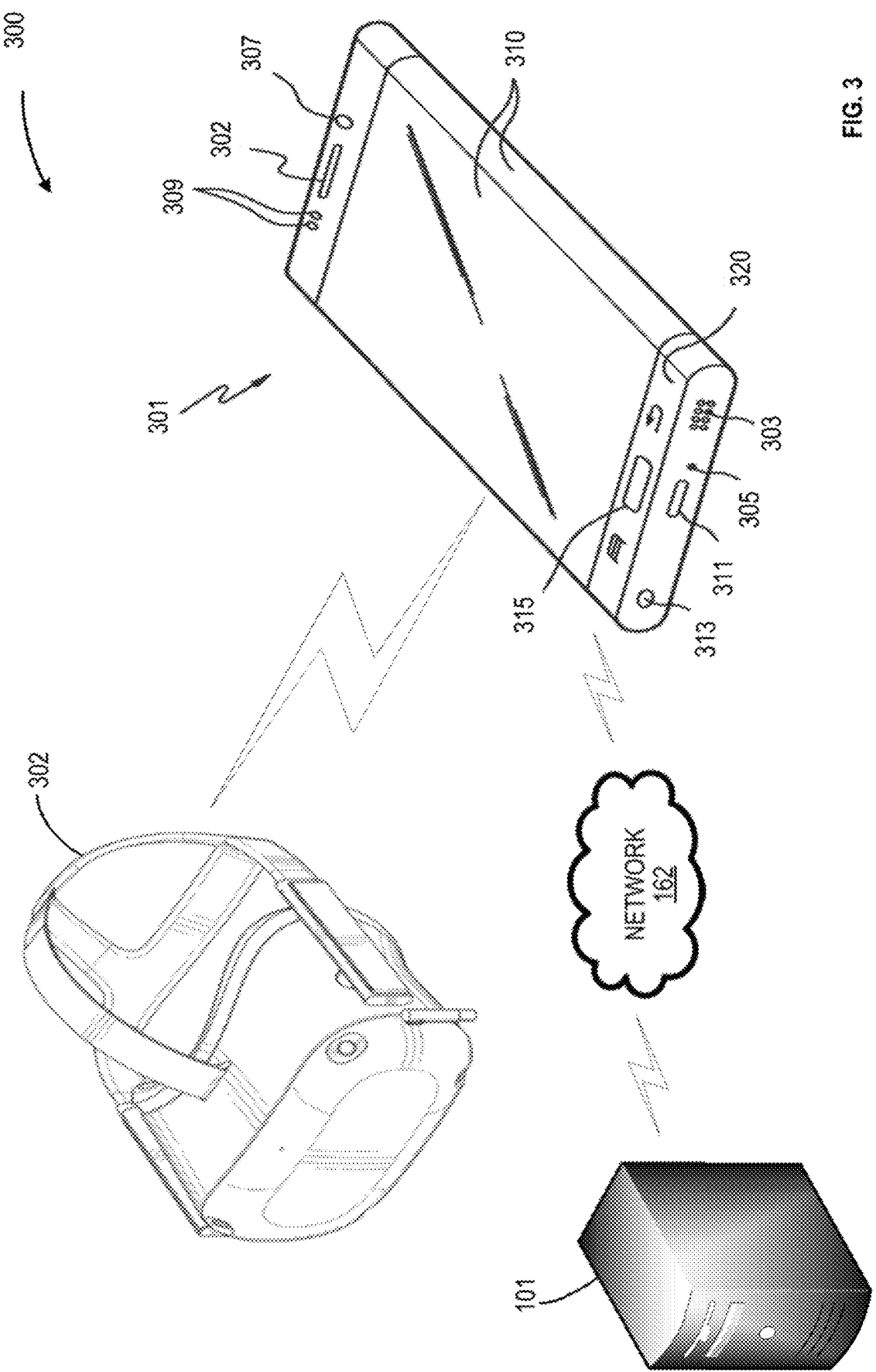
FIG. 3 shows an example system.

FIG. 3 shows an exemplary system 300. The system 300 may comprise various components which may be in communication with some or other or all components. FIG. 3 shows an exemplary system wherein the AR device 202 is in communication with the mobile device 301 and the mobile device 301 is in communication with the application server 106. The AR device 202 and the mobile device 301 may be communicatively coupled through a near field communication technology 301, for example Bluetooth Low Energy or WiFi. The mobile device 301 may be communicatively coupled to the server 106 through the network 162. The mobile device 301 may determine location information, for example the mobile device 301 may comprise a GPS sensor. The GPS sensor on the mobile device 301 may determine location information (e.g., GPS coordinates) and transmit location information to the server 106. The server 106 may determine other information, such as directional information, associated with the location information.

The AR device 302 may send data to the mobile device 301. The AR device may determine, via various sensors, image data, geographic data, orientation data and the like. The AR device 502 may transmit said data to the mobile device 301. For example, the system 800 may comprise the mobile device 301, the server 106, and the AR device 502 according to various embodiments of the present disclosure. The operation of the mobile device 301 according to various embodiments will be described in detail with reference to the drawings below. The mobile device 301 and the AR device 502 may be communicatively coupled to the server 106 through the network 162. According to various embodiments, the mobile device 301 may include a display 310, a housing (or a body) 320 to which the display 310 is coupled while the display 310 is seated therein, and an additional device formed on the housing 320 to perform the function of the mobile device 301. According to various embodiments, the additional device may include a first speaker 302, a second speaker 303, a microphone 305, sensors (for example, a front camera module 307, a rear camera module (not shown), and an illumination sensor 309, or the like), communication interfaces (for example, a charging or data input/output port 311 and an audio input/output port 313), and a button 315. According to various embodiments, when the mobile device 301 and the AR device 302 are connected through a wired communication scheme, the mobile device 301 and the AR device 302 may be connected based on at least some ports (for example, the data input/output port 311) of the communication interfaces.

According to various embodiments, the display 310 may include a flat display or a bended display (or a curved display) which can be folded or bent through a paper-thin or flexible substrate without damage. The bended display may be coupled to a housing 320 to remain in a bent form. According to various embodiments, the mobile device 301 may be implemented as a display device, which can be quite freely folded and unfolded such as a flexible display, including the bended display. According to various embodiments, in a Liquid Crystal Display (LCD), a Light Emitting Diode (LED) display, an Organic LED (OLED) display, or an Active Matrix OLED (AMOLED) display, the display 310 may replace a glass substrate surrounding liquid crystal with a plastic film to assign flexibility to be folded and unfolded.

Figure 4:
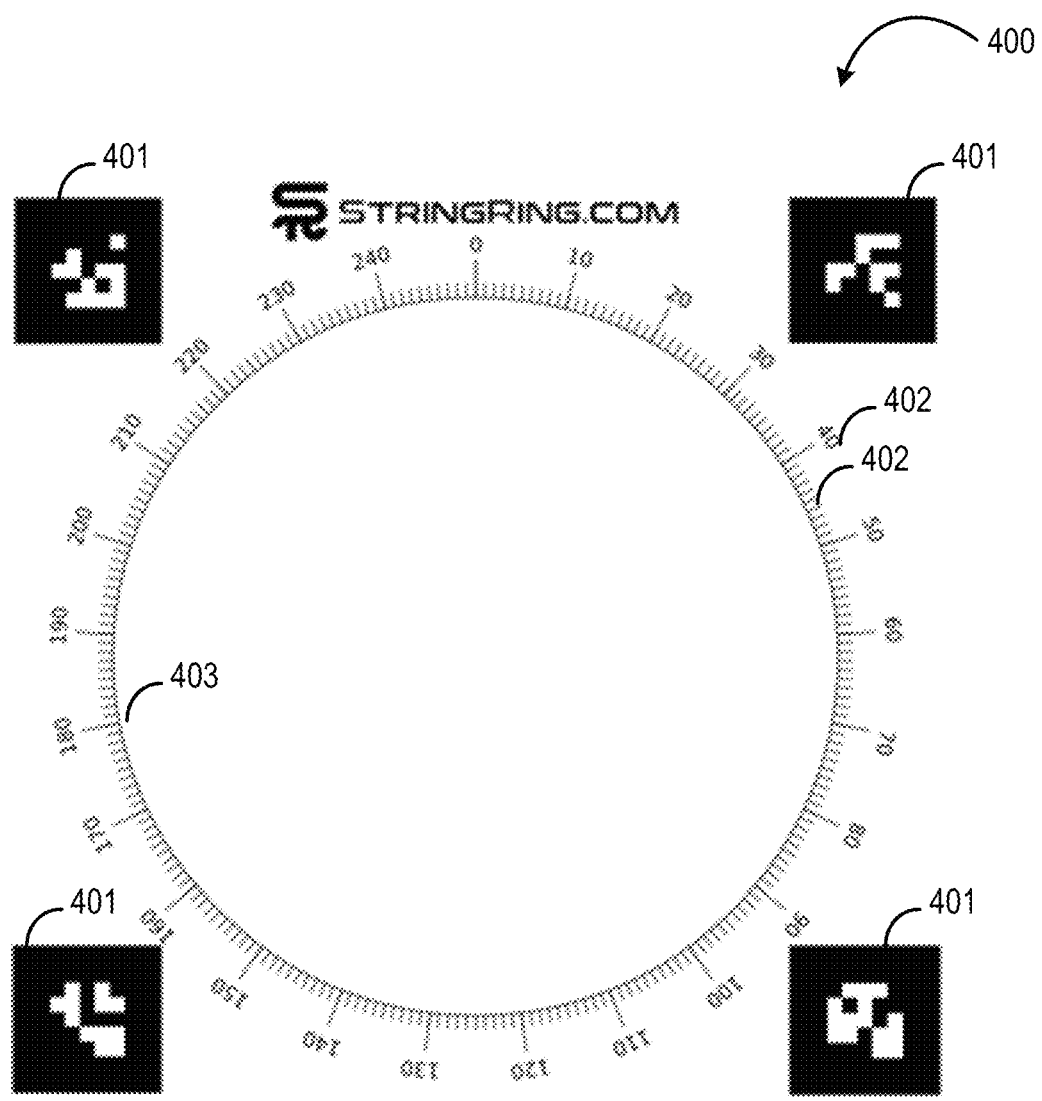
FIG. 4 shows an example template.

FIG. 4 shows an example template 400. The template 400 may be a digital template displayed on a display and/or may be a physical template configured to be secured to or otherwise associated with a physical loom or associated apparatus (e.g., a mount for the loom, etc.). For example, the template 400 may be mounted to the physical loom. The template may comprise one or more decals 401. The one or more decals 401 may comprise, for example one or more QR codes or any other scannable code configured to be scanned by, for example, a user device, an AR/VR device, and/or a computing device. The user device, AR/VR device, and/or computing device, may be configured to execute one or more actions based on scanning on the one or more decals 401. For example, an orientation of one or devices (and/or the loom itself) may be determined based on the one or more decals. For example, the user device and/or AR/VR device may determine an orientation with respect to the template (and by extension, the physical loom) by scanning the one or more registration decals.

The user device and/or the AR/VR device may be configured to open a browsing session based on scanning the one or more decals 401. For example, scanning the one or more decals 401 may cause the user device and/or the AR/VR device to navigate to a web page. The user device and/or the AR/VR device may be configured to launch one or more applications based on scanning the one or more decals 401. For example, the one or more decals 401 may be configured to cause the user device and/or AR/VR device to launch a string art application configured to receive image data and output one or more stringing instructions as described herein.

The template may comprise one or more pin indicators 402. While the example template 400 comprises 250 pin indicators, it is to be understood the template may comprise any number of pin indicators. The one or more pin indicators may correspond to the one or more pins on the physical (and/or virtual) loom. The one or more pin indicators may comprise numbers, dashes, dots, or any other demarcation corresponding to the pins on the physical loom. The template may comprise a loom position indicator 403. The loom position indicator may be similar in size and shape to the loom. While the template 400 shows a circular loom position indicator 403, it is to be understood the loom position indicator 403 may be any shape and any size. The loom position indicator 403 may be configured to indicate a position of the physical loom relative to the template. For example, in the template 400, to circular loom may be laid approximately on top of the loom position indicator 403. Similarly, the physical loom may be placed inside of (so as to be encompassed by) the loom position indicator 403. Similarly, the loom may be positioned outside of (so as to encompass) the loom position indicator 403.

Figure 5A:
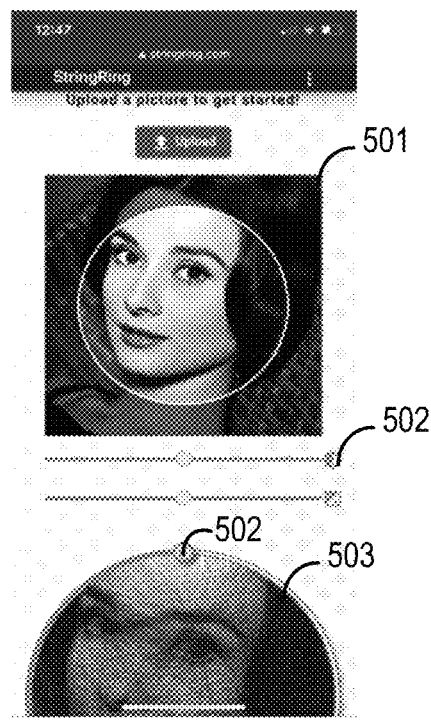
FIGS. 5A-5D show example interfaces.

FIGS. 5A-5D show example interfaces. The interfaces may be configured to display information associated with string art. For example, FIG. 5A shows an initial image 501 (e.g., a captured image, a downloaded image). The one or more interfaces may be configured to receive one or more user inputs. For example, the one or more interfaces may comprise an upload button configure cause an image to be uploaded to an application. The upload image button may designate an image upon which a string image generation algorithm may be executed.

Figure 5B:
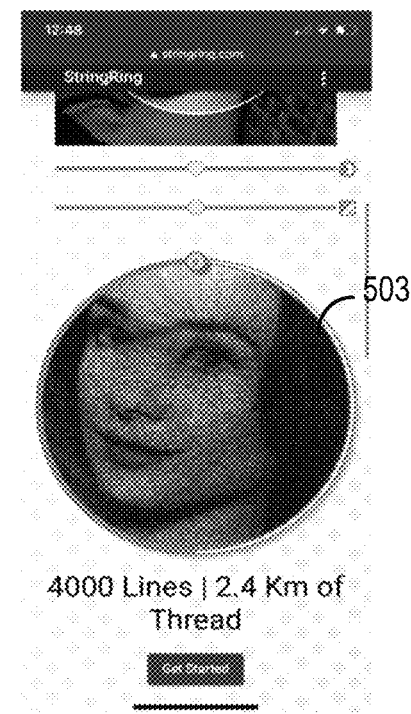

In FIG. 5A, the user has selected an initial image 501 of a woman. The one or more interfaces may be configured to display one or more selectable options (e.g., 502), one or more dials, one or more slides, combinations thereof, and the like. For example, the interface in FIG. 5A shows one or more sliders configured to be manipulated by a user. The one or more user inputs may allow a user to zoom and center the initial image. The one or more user inputs may be configured to alter (e.g., edit) the initial image by, for example cropping, centering, zooming, increasing or decrease contrast and/or any other aspect of the initial image. FIG. 5B shows a continuation of FIG. 5A featuring a string image 503 associated with the initial image. The application may be configured to determine, based on the string image, a number of lines (e.g., string paths), and a length of thread required to complete the string image. The one or more interfaces may be configured to display a selectable "Get Started" button. The "Get Started" button may be configured to cause output of the one or more stringing instructions (as seen in FIG. 5C).

Figure 5C:
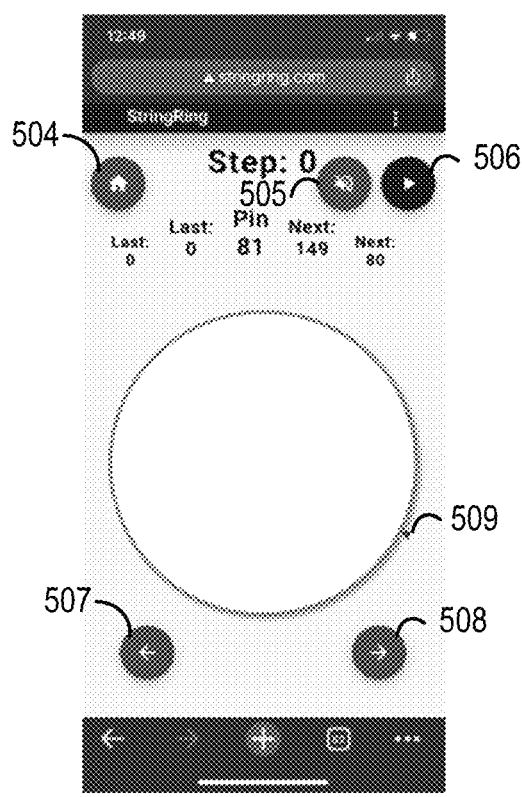
Figure 5D:
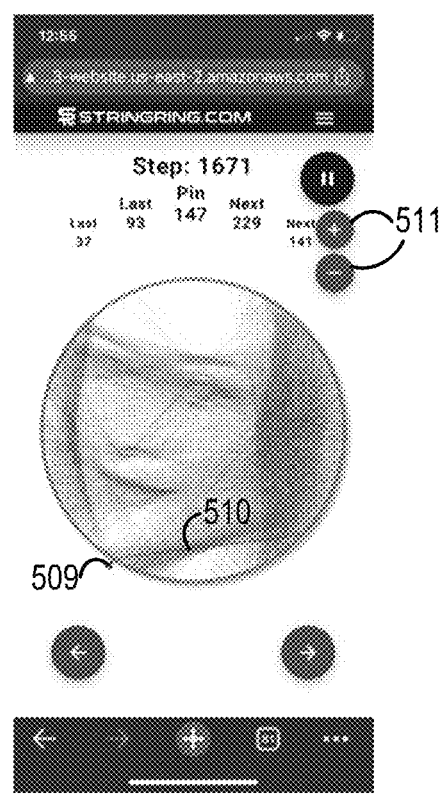

FIG. 5C shows an initial stringing page. In FIG. 5C, no string paths have been string. As seen in FIG. 5C, the one or more interfaces may be configured to display step number, a last pin, a current pin, and next pin. As seen in FIG. 5C, the one or more interfaces may be configured to display a home button 504, a mute/unmute button 505, a resume (e.g., a "play") button 506, a back button 507, a forward button 508, one or more pin indicators 509, combinations thereof, and the like. In addition to the forward and back buttons, a user may advance the instructions by swiping left or right on the one or more interfaces. The one or more pin indicators may be configured to indicate where a string should be attached to the loom (e.g., where a string should be strung, wound, fixed, etc.). FIG. 5D shows another interface of the one or more interfaces. In FIG. 5D the user is on step 1671, the last pin was 93, the pin prior to 93 was 37, the current pin is 147, the next pin is 229, and the pin after 229 is 141. In FIG. 5D, the current spring path 510 is indicated. Also in FIG. 5D, one or more speed adjustment buttons 511 are displayed. The one or more speed adjustment buttons 511 may be configured to receive one or more user inputs and adjust the speed at which the stringing instructions are advanced (e.g., once every second, once every ¼ second, any other speed).

Figure 6A:
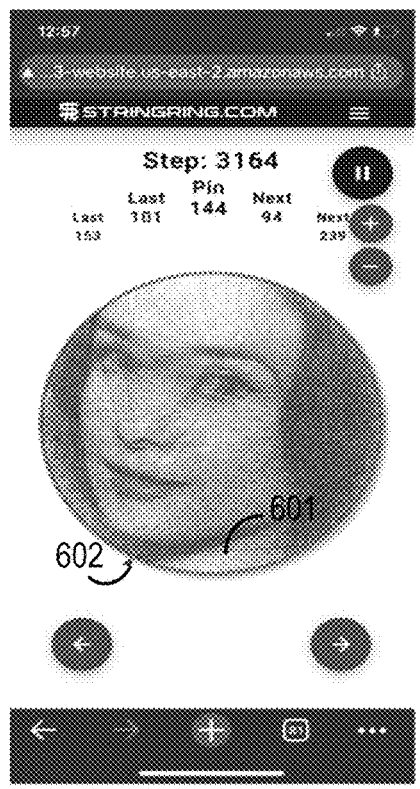
FIGS. 6A-6D show example interfaces.
Figure 6B:
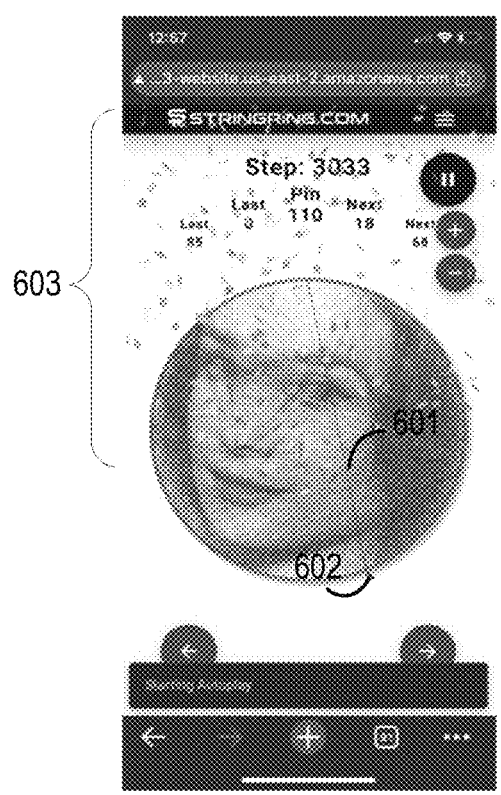
Figure 6C:
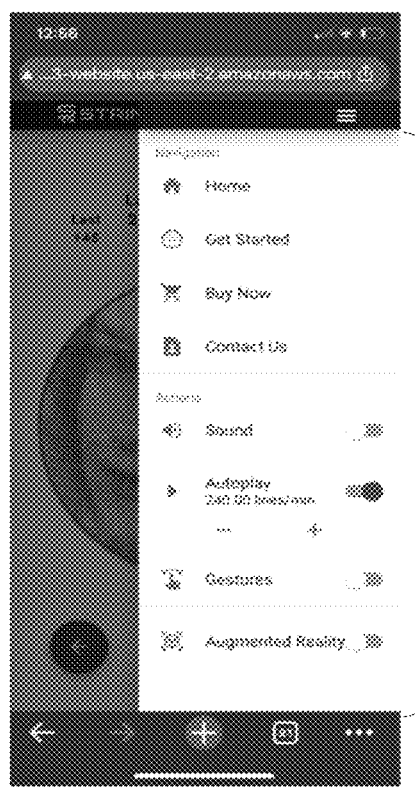
Figure 6D:
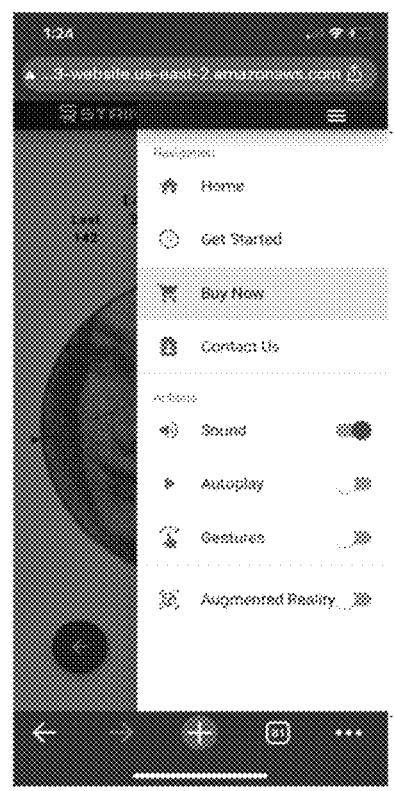

FIGS. 6A-6D show example interfaces. FIG. 6A shows an example interface of the one or more interfaces. FIG. 6A indicates a user is at step 3164, the previous step was pin 101, the step prior to pin 101 was pin 153, while the next step is pin 94 and the pin after pin 94 is pin 239. FIG. 6A shows a string indicator 601 and a pin indicator 602. FIG. 6B shows an example interface of the one or more interfaces. FIG. 6B indicates a user is at step 3033, the previous step was pin 0, the step prior to pin 0 was pin 85, while the next step is pin 18 and the pin after pin 18 is pin 68. FIG. 6B shows the string indicator 601 and the pin indicator 602. FIG. 6B also shows an example of a completion screen showing a celebratory completion indicator 603 comprising virtual colored confetti. The completion indicator may be any completion indicator and is not limited to virtual colored confetti. FIG. 6C shows an example menu 604. The menu 604 may comprise one or more options. For example, the menu 604 comprises one or more navigation options including a home option, a get started option, a buy now option, and a contact us option. The home option be configured to cause the application to, upon selection, open a home menu. The get started option may be configured to cause the application to begin generating stringing instructions for an initial image. The buy now option may be configured to cause the application to open a purchasing menu where a user may enter purchasing information including financial information such as credit information, shipping addresses etc., while the contact us option may open a page comprising contact information. The menu 604 may comprise one or more action options such as a sound option, an autoplay option, a gesture option, an augmented reality option, combinations thereof, and the like. In the menu 604, the autoplay option has been selected (at a frequency of 240.00 lines per minute). FIG. 6D shows an interface including a menu 605. In the menu 605, the sound option has been selected. The sound option may be configured to cause the application to output one or more audible stringing instructions.

Figure 7:
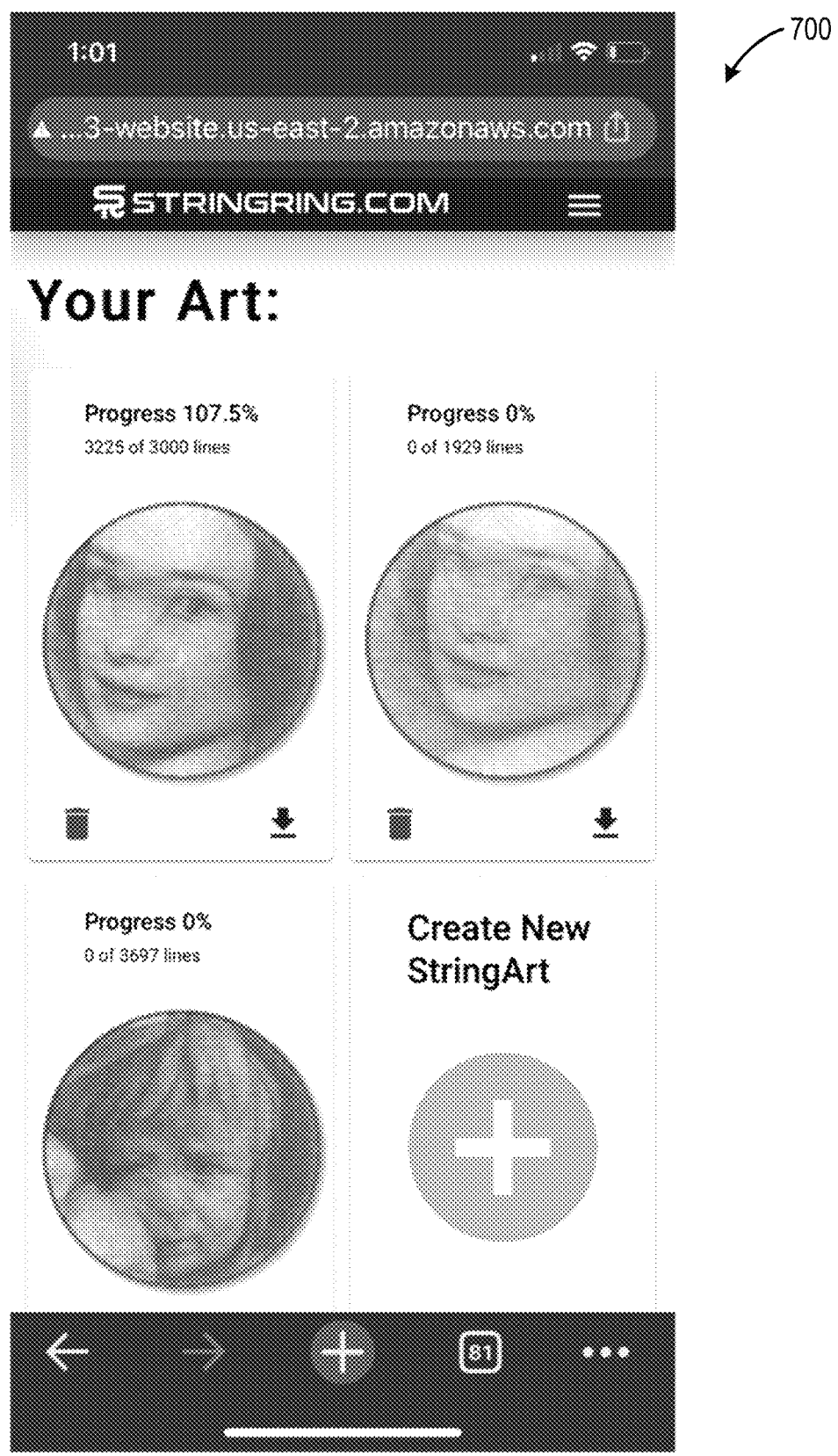
FIG. 7 shows an example interface.

FIG. 7 shows an example interface 700. The interface 700 shows in FIG. 7 is a Your Art interface. The interface 700 may be configured to output images of projects in progress. For example, the upper left shows a project that is 107.5% complete while the upper right show a project that is 0% complete. Similarly, the lower left shows a project that is 0% complete while the lower right presents a selectable option to Create New String Art.

Figure 8A:
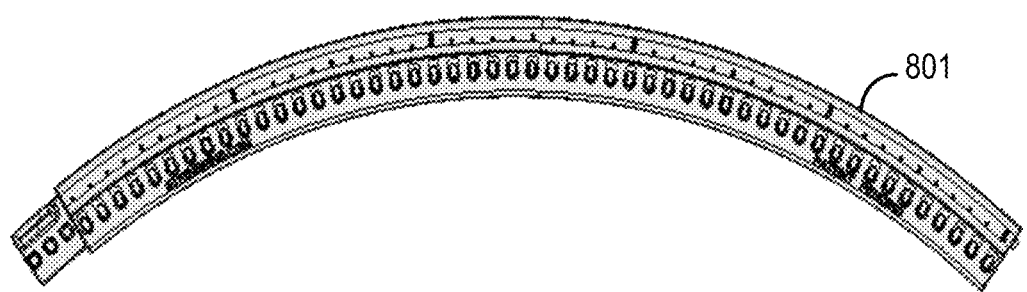
FIGS. 8A-8B show example loom devices.
Figure 8B:
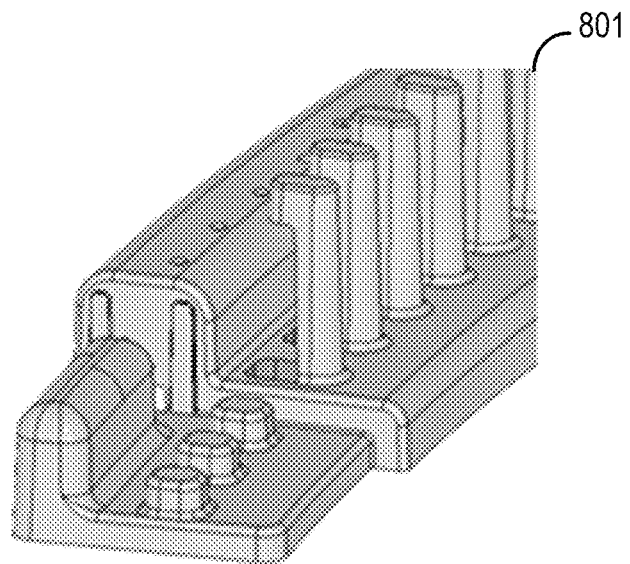

FIG. 8A and FIG. 8B show views of a part of an example loom device comprising one or more sections. FIG. 8A shows one section of the one or more sections of the loom device 801 and FIG. 8B shows a cross sectional view of the section of the one or more sections of the loom device. As seen in FIG. 8A and FIG. 8B, the loom device 801 may comprise one or more pins configured to receive string, yarn, thread, etc. . . . so as to fasten the string to the loom at the one or more pins. The loom device 801 may comprise one or more pin indicators corresponding to the one or more pins. For example, the FIG. 8A the one or more pin indicators are located around the perimeter of the loom device 801, proximate to the one or more pins. The loom device 801 may comprise any number of pins and any number of pin indicators.

FIG. 8B shows a cross sectional view of a section of the loom device 801. Each section of the one or more sections of the loom device 801 may be configured to be secured or otherwise fastened or attached to one or more other sections of the one or more sections of the loom device 801. For example, the one or more sections may be joined by a frictional fastener, a snap, hook-and-loop, buttons, adhesives, or any other method of joining two materials. In some embodiments, and as shown in FIGS. 8A-8B, a modular loom as disclosed herein comprises a plurality of modular loom sections. The modular loom sections may be interconnectable as described below. In the example embodiment, the modular loom is round and comprises twelve equally sized modular loom sections each having thirty pins, for a total of three-hundred sixty pins. However, the loom may comprise any whole number of sections which may or may not be equally sized, and sections may contain any number of pins. In some embodiments, the number of sections multiplied by the number of pins can equal three-hundred and sixty. Further, the modular loom may be otherwise shaped in some embodiments. For example, the modular loom may be a triangular loom comprised of three sections, may be any other platonic shape with a number of sections corresponding to the number of sides of the shape, or may be irregularly shaped, including having a combination of one or more straight and curved sections. According to various embodiments, a modular loom section comprises a elongate, rigid member having: a first end; a second end opposite the first end; an outer edge, and an inner edge opposite the outer edge; a first connector disposed proximate to the first end; and a second connector disposed proximate to the second end; wherein the first and second connector are configured for releasable co-engagement and the inner edge comprises a plurality of pins.

According to various embodiments, the modular loom section may be straight, arcuate, or of any size or length. In preferred embodiments, the modular loom section comprises an arc having arc angle measurement of thirty degree. In this way, twelve sections may be interconnected to form a modular loom. The sections may have thirty pins, such that the modular loom will have three-hundred and sixty pins. However, any suitable number of sections may be used having any suitable number of pins without departing from the scope of the present disclosure. However, too few or too many pins may cause difficulty with image quality, time needed to compute the pin sequence, the number of lines necessary for an acceptable image quality in the image or pins in the pin sequence, the difficulty of stringing, etc.

Figure 9A:
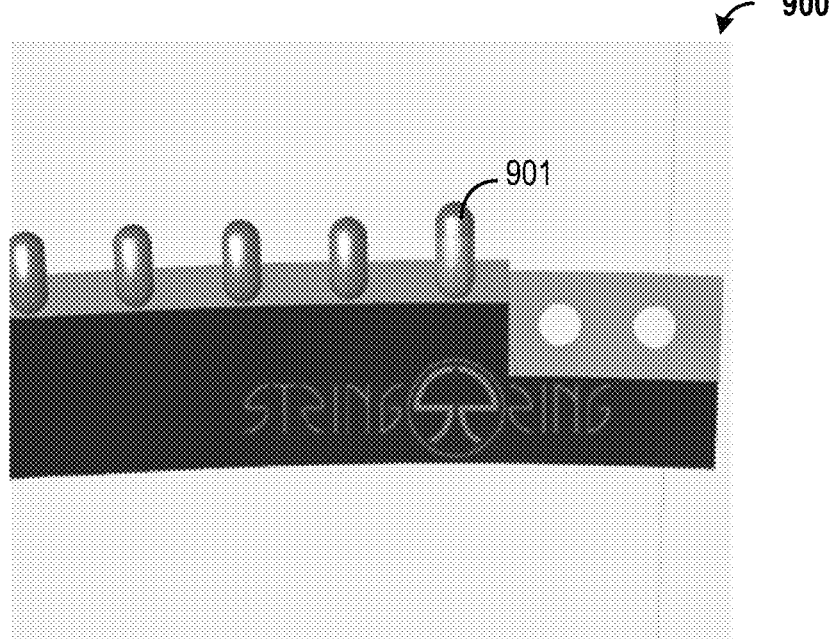
FIGS. 9A-9B show example displays.
Figure 9B:
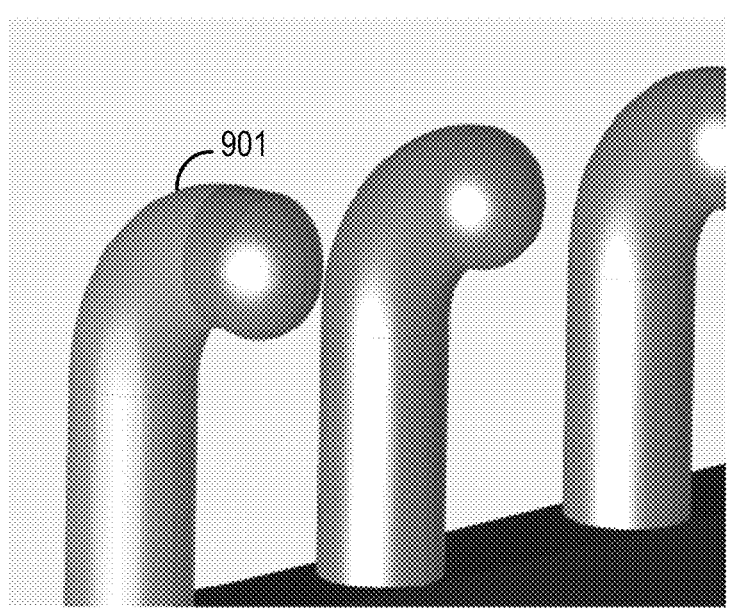

FIGS. 9A-9D show example augmented reality views. FIG. 9A shows an AR/VR view 901. The AR/VR view 900 shows a section of the virtual loom with a current pin highlighted. For example, the current pin may be the pin around which (or to which) a user is supposed to wind the string in order to complete the current step of the stringing instructions. The AR/VR view may be displayed on a user device and/or the AR/VR device. Similarly, FIG. 9B shows a close up of the AR/VR view 900 (the close up is labeled 910) with the current pin 901 similarly highlighted.

FIG. 10A shows example processor executable instructions 1001. A person skilled in the art will appreciate that these example processor executable instructions are merely exemplary and explanatory only and that any appropriate processor executable instructions and/or other configurations may be used. The processor executable instructions 1001 may be configured to determine, based on received image data, pixel data. For example, the processor executable instructions 1001 may be configured to determine a pixel value for each pixel of a plurality of pixels, the image being composed thereof. For example, a red pixel value, a green pixel value, a blue pixel value, or any other pixel may be extracted from a received image. Each pixel value may be associated with coefficient in a common algorithm to produce a grayscale output and associated contrast. The grayscale output and associated contrast may be modified according to the below where a is a value provided by a user via a user input slider in a range of 0-2 and where x is the grayscale output value $f(x)=\alpha(x-128)+128$. The grayscale and contrast adjusted value may be stored.

FIG. 10B shows example processor executable instructions 1002. A person skilled in the art will appreciate that these example processor executable instructions are merely exemplary and explanatory only and that any appropriate processor executable instructions and/or other configurations may be used. The processor executable instructions 1002 may be configured to determine pin locations. For example, using the image's size as reference, fill an array with 360 entries where each entry contains a vector of two values that correspond to pixel coordinates where that pin would be located. This array is then stored in memory for use in later code.

FIG. 10C shows example processor executable instructions 1003. A person skilled in the art will appreciate that these example processor executable instructions are merely exemplary and explanatory only and that any appropriate processor executable instructions and/or other configurations may be used. The processor executable instructions 1003 may be configured to determine potential lines between pins. For example, line_cache_y and line_cache_x are very large arrays that are populated with linear spaced vector (a line and the pixel values that make up that line) calculations for every possible combination of pins. These cached lines are used to speed up calculations in later code.

FIG. 11 shows example processor executable instructions 1101. A person skilled in the art will appreciate that these example processor executable instructions are merely exemplary and explanatory only and that any appropriate processor executable instructions and/or other configurations may be used. The processor executable instructions 1101 may be configured to determine string art. For example, the error value is an array populated with the grayscale and contrast adjusted pixel data from the source image. Starting with pin 0, each possible pin, excluding an offset of 20 pins, is checked for which linear vector stored in the cache has the greatest line error. Line error is the sum of the pixels in the error array that interfere with the cached line between two given pins. Once the greatest error value is found, the pin that resulted in that error is considered to be the "best pin" and we store that pin in the Line sequence array that will hold all the pins and order required to create the string art. The value of LINE_WEIGHT is subtracted from the error array pixels that interfered with the cached line that is associated with the chosen best pin. The chosen best pin becomes the current_pin value and then the process is repeated until 4000 lines have been calculated.

FIG. 12 shows an example method 1200. The method 1200 may be carried out on any one or more of the devices described herein such as the computing device 101. At 1210, an image may be received. The image may comprise, for example a digital image such as a digital photograph. Receiving the image may comprise capturing the image via an image capture device such as a camera (e.g., digital camera, smartphone, etc. . . . ) and/or downloading the image (e.g., from a database, from the Internet etc. . . . ). The received image may be a color image, a greyscale image, and/or a black and white image. Receiving the image may comprise receiving video and selecting a still frame of the video. The image data may be in RAW format, JPEG format, or any other format. The received image may comprise luminance data, chrominance data, positional data (e.g., location data), and other data.

At 1220, pixel data may be determined. Determining the pixel data may comprise determining, based on the reference image, one or more pixels. Determining the pixel data may comprise determining a number of pixels associated with the received image. Determining the pixel data may comprise determining location data, chrominance, luminance, or other properties of one or more pixels associated with the received image. For example, the red, green and blue pixel values may be extracted and combined with coefficients in a common algorithm to produce a grayscale output. Then the grayscale value's contrast may be modified using an algorithm where 'a' is a value provided by the user via input slider in a range of 0-2 and 'x' is a greyscale value $f(x)=\alpha(x-128)+128$. The grayscale and contrast adjusted value is then stored in an array for later use.

At 1230, a reference image may be determined. The reference image may be determined based on the received image. Determining the reference image may comprise analyzing image data associated with the received image. Determining the reference image may comprise determining a bitmap. For example, determining the reference image may comprise converting the received image to a greyscale image and/or black and white image. The reference image may be RAW, JPEG, TTFS, or any other file format.

At 1240, one or more stringing instructions may be determined. The one or more stringing instructions may comprise a pin sequence, a number of winds, a length of string, combinations thereof, and the like. Determining the one or more stringing instructions may comprise determining one more pin locations. For example, using the image's size as reference, an array may be filled with 360 entries where each entry contains a vector of two values that correspond to pixel coordinates where that pin is located. This array is then stored in memory for later use. Determining the one or more stringing instructions may comprise determining one or more string paths (e.g., "winds" between one or more pins on a loom), wherein each string path is associated with one or more image processing rounds. Processing the reference image may comprise determining, based on the pixel data, a darkest string path. The darkest string path may comprise a path between two pins have the darkest (e.g., lowest) average luminosity between pins. For a given round, the darkest string path may be determined to the string path to be wound during that round of string winding. Determining the one or more stringing instructions may comprise generating line caches in the x and y directions. The line caches may be Line_cache_y and line_cache_x which may comprise large arrays that configured to be populated with one or more linear spaced vectors (a line and the pixel values that make up that line) calculated for every possible combination of 360 pins.

An error value may be an array populated with the grayscale and contrast adjusted pixel data from the source image. Starting with pin 0, each possible pin, excluding an offset of 20 pins, may be checked for which linear vector stored in the cache has the greatest line error. Line error may be the sum of the pixels in the error array that interfere with the cached line between two given pins. Once the greatest error value is found, the pin that resulted in that error may be considered to be the "best pin" and may be stored pin in a Line_sequence array that will hold all the pins and order required to create the string art. The value of LINE_WEIGHT may be subtracted from the error array pixels that interfered with the cached line that is associated with the chosen best pin. The chosen best pin may then become the current_pin value and then the process is repeated until 4000 lines have been calculated.

At 1250, the one or more stringing instructions may be output. Outputting the one or more stringing instructions may comprise sending the one or more stringing instructions to, for example, a user device and/or an AR/VR device. The user device may comprise, for example, a computer or smartphone. Outputting the one or more stringing instructions may comprise causing the user device and/or the AR/VR device to display the stringing instructions. Displaying the stringing instructions may comprise displaying a pin sequence, a pin indicator, a string path indictor, combinations thereof, and the like. Outputting the one or more stringing instructions may comprise causing the user device and/or the AR/VR device to audibly output the one or more stringing instructions by, for example, speaking aloud the pin sequence, the previous pin, the current pin, the next pin, combinations thereof, and the like.

The method may comprise receiving one or more user inputs. The one or more user inputs may cause one or more of the received image or the reference image to be changed. For example, the one or more user inputs may comprise zooming in, zooming out, cropping, and other similar actions. The one or more user inputs may comprise adjusting contrast, brightness, shadows, or photo editing actions may cause the initial image or the reference image to be changed (e.g., edited).

FIG. 13 shows an example method 1300. At step 1310, image data may be determined. The image data may be determined based on a received image. The image data may be determined based on received image parameters. For example, the image may comprise a jpeg file downloaded from the Internet. For example, the image may be captured by a camera. The image data may comprise pixel values associated with a plurality of pixels. The image data may comprise luminosity and chrominance data associated with each pixel of the plurality of pixels. The image parameters may comprise, for example, one or more of: a number of winds, a string length, a number of pins, contrast, number of lines, line weight, image resolutions, combinations thereof, and the like.

At step 1320, a reference image may be generated. The reference image may comprise a grayscale version of the received image. The reference image may be associated with an array of pixel values. The array of pixel values may represent every possible string path.

At step 1330, a first string path may be determined according to the methods described herein. For example, determining a first string path may comprise determining a group of pixels linearly arranged between two pins that have the lowest average luminosity value. The first string path may be associated with a first string path line weight. The first string path may comprise a first pin associated with a starting point of the first string path and a second pin associated with the end of the first string path.

At step 1340, the reference image may be updated. Updating the reference image may comprise subtracting, from the reference image, the first string path. Subtracting the first string path may comprise updating one or more pixel values in the array of pixel values associated with the reference image. For example, a user input may indicate that the first string path has been executed and the pixel value of each pixel may be reduced by the line weight value. The line weight value may represent the darkness of the string used to generate the string art and thus, a single "wind" of the string may reduce the value of each pixel along the first string path by the line weight. For example, if a pixel along the first string path has an initial pixel value of 255 (meaning it is black), and the first string path is executed by winding a string associated with a line weight of 12, the updated pixel value associated with that pixel may be 243.

At step 1350, a second string path may be determined. For example, determining the second string path may comprise determining a group of pixels linearly arranged between two pins that have the lowest average luminosity value (e.g., the highest pixel value as measured from 0 being white to 255 being black) after the reference image has been updated (e.g., the pixel values of the reference image minus the pixel values of the first string path). The second string path may be associated with a second string path line weight. The second string path may comprise a first pin associated with a starting point of the first string path and a second pin associated with the end of the first string path.

At step 1360, the first string path and the second string path may be output. For example, outputting the first string path and the second string path may comprise sending the first string path and the second string path, as instructions (e.g., the "stringing instructions"). For example, outputting the first string path and the second string path may comprise causing display of the first string path and the second string path as instructions on a screen. In an embodiment, outputting the first string path and the second string path may comprise indicating, on an augmented reality display, the first pin and the second pin on the string path as well as an indication of an order in which to weave the string around the respective pins.

The method may comprise receiving one or more additional user inputs. For example, the one or more additional user inputs may cause the computing device to save progress (for example, by creating a file in a database) and return later. The one or more additional user inputs may cause the user interface to present options allowing a user to navigate forward or backward (e.g., between one or more previous or upcoming stringing instructions. The one or more additional user inputs may cause one or more changes in visual or audio settings. The one or more additional user inputs may cause an increase or decrease in a speed associated with the stringing instructions. For example, a time interval between audible instructions may be adjusted. For example, the one or more visual settings may comprise colors, presentation (or not) of numbers (e.g., pin numbers) or other features (e.g., real-time counters etc. . . . )

Figure 14:
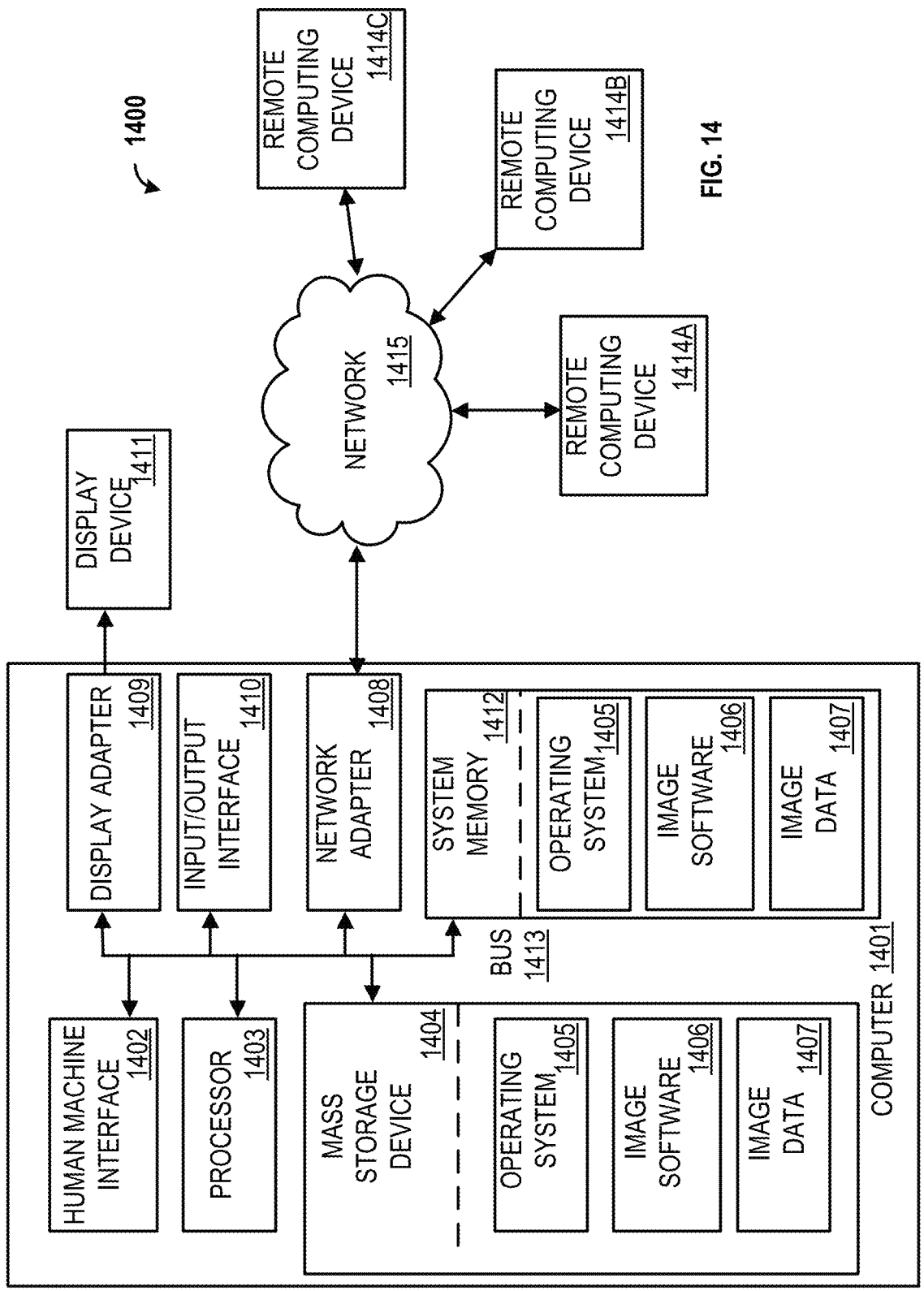
FIG. 14 shows an example system.

The methods and systems may be implemented on a computer 1401 as shown in FIG. 14 and described below. The image capture device 102 and the computing device 104 of FIG. 1 may be a computer 1401 as shown in FIG. 14. Similarly, the methods and systems described may utilize one or more computers to perform one or more functions in one or more locations. FIG. 14 is a block diagram of an operating environment for performing the present methods. This operating environment is a single configuration of many possible configurations of an operating environment, and it is not intended to suggest any limitation as to the scope of use or functionality of operating environment architecture. Neither should the operating environment be interpreted as having any dependency or requirement relating to any one or combination of components shown in the operating environment.

The present methods and systems may be operational with numerous other general purpose or special purpose computing system environments or configurations. Well-known computing systems, environments, and/or configurations that may be suitable for use with the systems and methods may be, but are not limited to, personal computers, server computers, laptop devices, and multiprocessor systems. Additional computing systems, environments, and/or configurations are set top boxes, programmable consumer electronics, network PCs, minicomputers, mainframe computers, distributed computing environments that are composed of any of the above systems or devices, and the like.

The processing of the present methods and systems may be performed by software components. The described systems and methods may be described in the general context of computer-executable instructions, such as program modules, being executed by one or more computers or other devices. Generally, program modules are composed of computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 1401. The components of the computer 1401 may be, but are not limited to, one or more processors 1403, a system memory 1412, and a system bus 1413 that couples various system components including the one or more processors 1403 to the system memory 1412. The system may utilize parallel computing.

The system bus 1413 represents one or more of several possible types of bus structures, including a memory bus or memory controller, a peripheral bus, an accelerated graphics port, or local bus using any of a variety of bus architectures. Such architectures may be an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1413, and all buses specified in this description may also be implemented over a wired or wireless network connection and each of the subsystems, including the one or more processors 1403, a mass storage device 1404, an operating system 1405, object identification and action determination software 1406, image data 1407, a network adapter 1408, the system memory 1412, an Input/Output Interface 1410, a display adapter 1409, a display device 1411, and a human machine interface 1402, may be contained within one or more remote computing devices 1414A,B,C at physically separate locations, connected through buses of this form, in effect implementing a fully distributed system.

The computer 1401 is typically composed of a variety of computer readable media. Readable media may be any available media that is accessible by the computer 1401 and may be both volatile and non-volatile media, removable and non-removable media. The system memory 1412 may be computer readable media in the form of volatile memory, such as random access memory (RAM), and/or non-volatile memory, such as read only memory (ROM). The system memory 1412 is typically composed of data such as the image data 1407 and/or program modules such as the operating system 1405 and the object identification and action determination software 1406 that are immediately accessible to and/or are presently operated on by the one or more processors 1403.

The computer 1401 may also be composed of other removable/non-removable, volatile/non-volatile computer storage media. FIG. 14 shows a mass storage device 1404, which may provide non-volatile storage of computer code, computer readable instructions, data structures, program modules, and other data for the computer 1401. The mass storage device 1404 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1404, such as the operating system 1405 and the object identification and action determination software 1406. Each of the operating system 1405 and the object identification and action determination software 1406 (or some combination thereof) may be elements of the programming and the object identification and action determination software 1406. The image data 1407 may also be stored on the mass storage device 1404. The image data 1407 may be stored in any of one or more databases known in the art. Such databases are DB2®, Microsoft® Access, Microsoft® SQL Server, Oracle®, MySQL, PostgreSQL, and the like. The databases may be centralized or distributed across multiple systems.

The user may enter commands and information into the computer 1401 via an input device (not shown). Such input devices may be, but are not limited to, a keyboard, pointing device (e.g., a "mouse"), a microphone, a joystick, a scanner, tactile input devices such as gloves, and other body coverings, and the like These and other input devices may be connected to the one or more processors 1403 via the human machine interface 1402 that is coupled to the system bus 1413, but may be connected by other interface and bus structures, such as a parallel port, game port, an IEEE 1394 Port (also known as a Firewire port), a serial port, or a universal serial bus (USB).

The display device 1411 may also be connected to the system bus 1413 via an interface, such as the display adapter 1409. It is contemplated that the computer 1401 may have more than one display adapter 1409 and the computer 1401 may have more than one display device 1411. The display device 1411 may be a monitor, an LCD (Liquid Crystal Display), or a projector. In addition to the display device 1411, other output peripheral devices may be components such as speakers (not shown) and a printer (not shown) which may be connected to the computer 1401 via the Input/Output Interface 1410. Any step and/or result of the methods may be output in any form to an output device. Such output may be any form of visual representation, including, but not limited to, textual, graphical, animation, audio, tactile, and the like. The display device 1411 and computer 1401 may be part of one device, or separate devices.

The computer 1401 may operate in a networked environment using logical connections to one or more remote computing devices 1414A,B,C. A remote computing device may be a personal computer, portable computer, smartphone, a server, a router, a network computer, a peer device or other common network node, and so on. Logical connections between the computer 1401 and a remote computing device 1414A,B,C may be made via a network 1415, such as a local area network (LAN) and/or a general wide area network (WAN). Such network connections may be through the network adapter 1408. The network adapter 1408 may be implemented in both wired and wireless environments. Such networking environments are conventional and commonplace in dwellings, offices, enterprise-wide computer networks, intranets, and the Internet.

Application programs and other executable program components such as the operating system 1405 are shown herein as discrete blocks, although it is recognized that such programs and components reside at various times in different storage components of the computing device 1401, and are executed by the one or more processors 1403 of the computer. An implementation of the object identification and action determination software 1406 may be stored on or sent across some form of computer readable media. Any of the described methods may be performed by computer readable instructions embodied on computer readable media. Computer readable media may be any available media that may be accessed by a computer. Computer readable media may be "computer storage media" and "communications media." "Computer storage media" may be composed of volatile and non-volatile, removable and non-removable media implemented in any methods or technology for storage of information such as computer readable instructions, data structures, program modules, or other data. Further, computer storage media may be, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ Artificial Intelligence techniques such as machine learning and iterative learning. Such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and methods and systems described therein be considered exemplary only, with a true scope and spirit being indicated by the following claims.

What is claimed is:

1. A method comprising:
   receiving an image;
   determining, based on the received image, pixel data associated with the received image;
   determining, based on the pixel data, a reference image associated with the received image;
   determining, based on the pixel data and the reference image, one or more stringing instructions; and
   outputting the one or more stringing instructions.

2. The method of claim 1, wherein receiving the image comprises one or more of:
   capturing the image with an image capture device or downloading the image from a database.

3. The method of claim 1, wherein the pixel data comprises one or more of:
   position data associated with the one or more pixels, luminance data associated with the one or more pixels, or chrominance data associated with the one or more pixels.

4. The method of claim 1, wherein the reference image comprises a greyscale version of the received image and wherein the one or more stringing instructions comprise at least one pin sequence configured to generate a string image associated with the reference image.

5. The method of claim 1, wherein determining the one or more stringing instructions comprises determining, based on the pixel data, for one or more string paths, one or more average luminosities.

6. The method of claim 1, wherein outputting the one or more stringing instructions comprises:
   sending, to a user device the one or more stringing instructions; and
   causing the user device to at least one of: display the one or more stringing instructions or output audible stringing instructions.

7. The method of claim 1, further comprising:
   receiving, from a user device, a completion indication associated with a first stringing instruction of the one or more stringing instructions; and
   causing, based on the completion indication associated with the first stringing instruction, output of a second stringing instruction of the one or more stringing instructions.

8. An apparatus comprising:
   one or more processors; and
   memory storing processor executable instructions that, when executed by the one or more processors, cause the apparatus to:
   receive an image;
   determine, based on the received image, pixel data associated with the received image;
   determine, based on the pixel data, a reference image associated with the received image;
   determine, based on the pixel data and the reference image, one or more stringing instructions; and
   output the one or more stringing instructions.

9. The apparatus of claim 8, wherein receiving the image comprises one or more of: capturing the image with an image capture device or downloading the image from a database.

10. The apparatus of claim 8, wherein the pixel data comprises one or more of:

position data associated with the one or more pixels, luminance data associated with the one or more pixels, or chrominance data associated with the one or more pixels.

11. The apparatus of claim 8, wherein the reference image comprises a greyscale version of the received image and wherein the one or more stringing instructions comprise at least one pin sequence configured to generate a string image associated with the reference image.

12. The apparatus of claim 8, wherein the processor executable instructions that, when executed by the one or more processors, cause the apparatus to determine the one or more stringing instructions, further cause the apparatus to determine, based on the pixel data, for one or more string paths, one or more average luminosities.

13. The apparatus of claim 8, wherein the processor executable instructions that, when executed by the one or more processors, cause the apparatus to output the one or more stringing instructions, further cause the apparatus to:
 send, to a user device the one or more stringing instructions; and
 cause the user device to at least one of: display the one or more stringing instructions or output audible stringing instructions.

14. The apparatus of claim 8, wherein the processor executable instructions, when executed by the one or more processors, further cause the apparatus to:
 receive, from a user device, a completion indication associated with a first stringing instruction of the one or more stringing instructions; and
 cause, based on the completion indication associated with the first stringing instruction, output of a second stringing instruction of the one or more stringing instructions.

15. A system comprising:
 a computing device configured to:
  receive an image;
  determine, based on the received image, pixel data associated with the received image;
  determine, based on the pixel data, a reference image associated with the received image;
  determine, based on the pixel data and the reference image, one or more stringing instructions; and
  output the one or more stringing instructions; and
 a user device configured to:
  receive the one or more stringing instructions.

16. The system of claim 15, wherein receiving the image comprises one or more of: capturing the image with an image capture device or downloading the image from a database.

17. The system of claim 15, wherein the pixel data comprises one or more of:
 position data associated with the one or more pixels, luminance data associated with the one or more pixels, or chrominance data associated with the one or more pixels.

18. The system of claim 15, wherein the computing device is further configured to determine, based on the pixel data, for one or more string paths, one or more average luminosities.

19. The system of claim 15, wherein the computing device is further configured to:
 send, to a user device the one or more stringing instructions; and
 cause the user device to at least one of: display the one or more stringing instructions or output audible stringing instructions.

20. The system of claim 15, wherein the computing device is further configured to:
 receive, from a user device, a completion indication associated with a first stringing instruction of the one or more stringing instructions; and
 cause, based on the completion indication associated with the first stringing instruction, output of a second stringing instruction of the one or more stringing instructions.

\* \* \* \* \*